US012737558B2

(12) United States Patent
DeFoor et al.

(10) Patent No.: US 12,737,558 B2
(45) Date of Patent: *Sep. 15, 2026

(54) QUERY EVALUATION IN NATURAL LANGUAGE PROCESSING SYSTEMS

(71) Applicant: Casetext, Inc., San Francisco, CA (US)

(72) Inventors: Walter DeFoor, Rockville, MD (US); Ryan Walker, Lancaster, PA (US); Javed Qadrud-Din, Union City, CA (US); Pablo Arredondo, Palo Alto, CA (US)

(73) Assignee: Casetext, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,544

(22) Filed: Mar. 29, 2024

(65) Prior Publication Data

US 2025/0005301 A1 Jan. 2, 2025

Related U.S. Application Data

(63) Continuation of application No. 18/362,738, filed on Jul. 31, 2023, now Pat. No. 11,972,223.

(Continued)

(51) Int. Cl.
*G06F 40/40* (2020.01)
*G06F 40/205* (2020.01)
(Continued)

(52) U.S. Cl.
CPC ............ *G06F 40/40* (2020.01); *G06F 40/289* (2020.01); *G06N 20/00* (2019.01); *G06F 40/205* (2020.01)

(58) Field of Classification Search
CPC ...... G06F 40/40; G06F 40/289; G06F 40/205; G06F 40/131; G06F 40/35
See application file for complete search history.

(56) References Cited

U.S. PATENT DOCUMENTS 7,257,766 B1 8/2007 Koppel et al.
7,293,012 B1 11/2007 Solaro et al.
(Continued)

FOREIGN PATENT DOCUMENTS

CN 109213870 A 1/2019
JP 2021152837 A 9/2021
(Continued)

OTHER PUBLICATIONS

Aggarwal, Vi nay, et al. "CLAUSE REC: A Clause Recommendation Framework for AI-aided Contract Authoring." arXiv preprint arXiv :2110.15794 (2021), pp. 1-7 (Year: 2021).
(Continued)

*Primary Examiner* — Anne L Thomas-Homescu

(57) ABSTRACT

A system may determine relevance prompts based on input documents and a relevance prompt template and may transmit the plurality of relevance prompts to a large language model for completion. The system may receive response messages including chunk relevance scores. The system may select a subset of the input documents based on the chunk relevance scores. The system may determine query response prompts including text from the selected input documents the natural language query, and a second set of natural language instructions to address the natural language query. The system may determine a response to the natural language query based on answers determined in response to the query response prompts.

14 Claims, 17 Drawing Sheets

Related U.S. Application Data

(60) Provisional application No. 63/511,191, filed on Jun. 30, 2023.

(51) Int. Cl.

| | |
|---|---|
| ***G06F 40/289*** | (2020.01) |
| ***G06N 20/00*** | (2019.01) |

(56) References Cited

U.S. PATENT DOCUMENTS

| | | | | |
|---|---|---|---|---|
| 7,567,953 | B2 | 7/2009 | Kadayam et al. | |
| 7,813,915 | B2 * | 10/2010 | Nakao | G06F 40/258 704/7 |
| 8,380,710 | B1 | 2/2013 | Finne et al. | |
| 8,635,228 | B2 | 1/2014 | Shahabi et al. | |
| 8,812,291 | B2 | 8/2014 | Brants et al. | |
| 9,146,967 | B2 | 9/2015 | Dean et al. | |
| 10,565,639 | B1 | 2/2020 | Ghamsari et al. | |
| 11,086,949 | B1 | 8/2021 | Desai et al. | |
| 11,263,188 | B2 | 3/2022 | Arnold et al. | |
| 11,281,976 | B2 | 3/2022 | Dua et al. | |
| 11,288,444 | B2 | 3/2022 | Munro et al. | |
| 11,314,811 | B1 | 4/2022 | Hume et al. | |
| 11,321,329 | B1 | 5/2022 | Shih et al. | |
| 11,481,416 | B2 | 10/2022 | Dua et al. | |
| 11,676,231 | B1 * | 6/2023 | Crouse | G06F 16/906 707/723 |
| 11,765,207 | B1 | 9/2023 | McCarthy | |
| 11,797,610 | B1 | 10/2023 | Ferrucci et al. | |
| 11,860,914 | B1 | 1/2024 | Qadrud-Din et al. | |
| 11,861,320 | B1 | 1/2024 | Gajek et al. | |
| 11,861,321 | B1 | 1/2024 | O'Kelly et al. | |
| 11,972,223 | B1 | 4/2024 | DeFoor et al. | |
| 11,995,411 | B1 | 5/2024 | Qadrud-Din et al. | |
| 12,067,366 | B1 | 8/2024 | Heller et al. | |
| 12,111,858 | B1 | 10/2024 | Radhakrishnan et al. | |
| 12,159,119 | B2 | 12/2024 | Heller et al. | |
| 12,229,522 | B2 | 2/2025 | Gajek et al. | |
| 12,259,915 | B2 | 3/2025 | Qadrud-Din et al. | |
| 12,299,406 | B2 | 5/2025 | Qadrud-Din et al. | |
| 2002/0169595 | A1 | 11/2002 | Agichtein et al. | |
| 2004/0215606 | A1 | 10/2004 | Cossock | |
| 2005/0108219 | A1 | 5/2005 | Huerga | |
| 2006/0074865 | A1 | 4/2006 | Merrigan et al. | |
| 2007/0022109 | A1 | 1/2007 | Imielinski et al. | |
| 2007/0266331 | A1 | 11/2007 | Bicker et al. | |
| 2009/0083248 | A1 | 3/2009 | Liu et al. | |
| 2010/0145673 | A1 | 6/2010 | Cancedda | |
| 2011/0125734 | A1 | 5/2011 | Duboue et al. | |
| 2012/0030201 | A1 | 2/2012 | Pickering et al. | |
| 2013/0073995 | A1 | 3/2013 | Piantino et al. | |
| 2013/0145241 | A1 | 6/2013 | Salama | |
| 2014/0067374 | A1 | 3/2014 | Wilkins et al. | |
| 2014/0129559 | A1 | 5/2014 | Estes | |
| 2014/0172907 | A1 | 6/2014 | Dubbels et al. | |
| 2014/0358889 | A1 | 12/2014 | Shmiel et al. | |
| 2015/0016957 | A1 | 1/2015 | Schinko et al. | |
| 2015/0026212 | A1 | 1/2015 | Fink et al. | |
| 2015/0370421 | A1 | 12/2015 | Joshi et al. | |
| 2016/0078149 | A1 | 3/2016 | Gaucher et al. | |
| 2016/0196351 | A1 | 7/2016 | Bank et al. | |
| 2017/0286849 | A1 | 10/2017 | Myslinski | |
| 2017/0351754 | A1 | 12/2017 | Devarakonda et al. | |
| 2018/0075011 | A1 | 3/2018 | Allen et al. | |
| 2018/0322110 | A1 | 11/2018 | Rhodes et al. | |
| 2018/0329987 | A1 | 11/2018 | Tata et al. | |
| 2019/0042551 | A1 | 2/2019 | Hwang | |
| 2019/0286753 | A1 | 9/2019 | Feng et al. | |
| 2019/0311064 | A1 | 10/2019 | Chakraborty et al. | |
| 2019/0347563 | A1 | 11/2019 | Bruno et al. | |
| 2020/0019642 | A1 | 1/2020 | Dua et al. | |
| 2020/0065346 | A1 | 2/2020 | Boni et al. | |
| 2020/0159783 | A1 | 5/2020 | Shlyunkin et al. | |
| 2020/0243076 | A1 | 7/2020 | Kim | |
| 2020/0342036 | A1 | 10/2020 | Fowlkes et al. | |
| 2020/0342862 | A1 | 10/2020 | Gao et al. | |
| 2020/0364403 | A1 | 11/2020 | Choi et al. | |
| 2021/0056261 | A1 | 2/2021 | Sullivan et al. | |
| 2021/0081499 | A1 | 3/2021 | Rakshit et al. | |
| 2021/0124876 | A1 | 4/2021 | Kryscinski et al. | |
| 2021/0271823 | A1 | 9/2021 | De Ridder | |
| 2021/0326428 | A1 | 10/2021 | Edwards et al. | |
| 2021/0374341 | A1 | 12/2021 | Krause et al. | |
| 2021/0406475 | A1 | 12/2021 | Tang et al. | |
| 2021/0406735 | A1 | 12/2021 | Nahamoo et al. | |
| 2022/0051479 | A1 | 2/2022 | Agarwal et al. | |
| 2022/0092095 | A1 | 3/2022 | Shukla et al. | |
| 2022/0164397 | A1 | 5/2022 | Escalona et al. | |
| 2022/0180051 | A1 | 6/2022 | Lillemo et al. | |
| 2022/0197958 | A1 | 6/2022 | Volynets et al. | |
| 2022/0253447 | A1 | 8/2022 | Boytsov et al. | |
| 2022/0261429 | A1 | 8/2022 | Refaeli et al. | |
| 2022/0284174 | A1 | 9/2022 | Galitsky | |
| 2022/0300718 | A1 | 9/2022 | Chen et al. | |
| 2022/0318230 | A1 | 10/2022 | Sikka et al. | |
| 2022/0318255 | A1 | 10/2022 | Fei et al. | |
| 2022/0357929 | A1 | 11/2022 | Vijayaraghavan et al. | |
| 2022/0366127 | A1 | 11/2022 | Desh et al. | |
| 2022/0374459 | A1 | 11/2022 | Liu et al. | |
| 2022/0382975 | A1 | 12/2022 | Gu et al. | |
| 2023/0034011 | A1 | 2/2023 | Sarkar et al. | |
| 2023/0080674 | A1 | 3/2023 | Attali et al. | |
| 2023/0108863 | A1 | 4/2023 | Gunasekara et al. | |
| 2023/0121711 | A1 | 4/2023 | Chhaya et al. | |
| 2023/0177269 | A1 * | 6/2023 | Lundin | G06N 20/00 715/204 |
| 2023/0237277 | A1 | 7/2023 | Reza et al. | |
| 2023/0245051 | A1 | 8/2023 | Vuyyuri et al. | |
| 2023/0274084 | A1 | 8/2023 | Modani et al. | |
| 2023/0316001 | A1 | 10/2023 | Araki | |
| 2023/0351105 | A1 | 11/2023 | Mammen | |
| 2024/0202452 | A1 | 6/2024 | Schillace et al. | |
| 2024/0242037 | A1 | 7/2024 | Heller et al. | |
| 2024/0256622 | A1 * | 8/2024 | Abrams | G06F 16/9538 |
| 2024/0273309 | A1 | 8/2024 | Heller et al. | |
| 2024/0289363 | A1 | 8/2024 | Qadrud-Din et al. | |
| 2024/0289395 | A1 * | 8/2024 | Zhou | G06F 16/9532 |
| 2024/0289559 | A1 | 8/2024 | Gajek et al. | |
| 2024/0289561 | A1 | 8/2024 | Qadrud-Din et al. | |
| 2024/0303421 | A1 | 9/2024 | Fabian et al. | |
| 2024/0303424 | A1 | 9/2024 | Reddy et al. | |
| 2024/0320257 | A1 * | 9/2024 | Amoateng | G06F 16/9535 |
| 2024/0386037 | A1 * | 11/2024 | Chockalingam | G06F 40/40 |
| 2024/0394942 | A1 * | 11/2024 | Shankhdhar | G06V 30/418 |
| 2024/0428008 | A1 * | 12/2024 | Abraham | G06F 16/3329 |
| 2025/0005300 | A1 | 1/2025 | O'Kelly et al. | |
| 2025/0053754 | A1 | 2/2025 | Heller et al. | |
| 2025/0061279 | A1 | 2/2025 | deLevie | |
| 2025/0077778 | A1 * | 3/2025 | Zhang | G06F 16/38 |
| 2025/0200082 | A1 | 6/2025 | Qadrud-Din et al. | |

FOREIGN PATENT DOCUMENTS

| | | | | |
|---|---|---|---|---|
| KR | 101868421 B1 | | 6/2018 | |
| WO | 2024151396 A1 | | 7/2024 | |
| WO | WO-2024163599 A1 | * | 8/2024 | G06F 16/9532 |
| WO | 2025006030 A1 | | 1/2025 | |
| WO | 2025006031 A1 | | 1/2025 | |
| WO | 2025006032 A1 | | 1/2025 | |
| WO | 2025038198 A1 | | 2/2025 | |

OTHER PUBLICATIONS

U.S. Appl. No. 18/154,175, Advisory Action mailed Nov. 30, 2023, 3 pgs.

U.S. Appl. No. 18/154,175, Final Office Action mailed Jun. 29, 2023, 22 pgs.

U.S. Appl. No. 18/154,175, Non Final Office Action mailed Apr. 21, 2023, 20 pgs.

U.S. Appl. No. 18/169,701, Final Office Action mailed Jun. 29, 2023, 42 pgs.

U.S. Appl. No. 18/169,701, Non Final Office Action mailed May 3, 2023, 38 pgs.

(56) References Cited

OTHER PUBLICATIONS

U.S. Appl. No. 18/169,707, Non Final Office Action mailed May 10, 2023, 33 pgs.
U.S. Appl. No. 18/169,707, Non Final Office Action mailed Jan. 4, 2024, 38 pgs.
U.S. Appl. No. 18/329,035, Notice of Allowance mailed Aug. 25, 2023, 21 pgs.
U.S. Appl. No. 18/329,039, Notice of Allowance mailed Jan. 22, 2024, 8 pgs.
U.S. Appl. No. 18/333,320, Non Final Office Action mailed Aug. 7, 2023, 13 pgs.
U.S. Appl. No. 18/333,320, Notice of Allowance mailed Aug. 22, 2023, 13 pgs.
U.S. Appl. No. 18/344,344, Notice of Allowance mailed Aug. 30, 2023, 10 pgs.
U.S. Appl. No. 18/362,738, Non Final Office Action mailed Oct. 24, 2023, 15 pgs.
U.S. Appl. No. 18/362,738, Notice of Allowance mailed Jan. 4, 2024, 10 pgs.
Arruda, Andrew. "An ethical obligation to use artificial intelligence: An examination of the use of artificial intelligence in law and the model rules of professional responsibility." Am. J. Trial Advoc. 40 (2016), pp. 443-458 (Year: 2016).
Barsha et al., "Natural Language Interface to Database by Regular Expression Generation." 2021 5th International Conference on Electrical Information and Communication Technology (EICT). IEEE, (Year: 2021).
Chalkidis, Ilias, et al. "LEGAL-BERT: The muppets straight out of law school." arXiv preprint arXiv:2010.02559 (2020), pp. 1-7 (Year: 2020).
Chen et al. ("Data Extraction via Semantic Regular Expression Synthesis." arXiv preprint arXiv:2305.10401 (May 17, 2023)) (Year: 2023).
Definition of Database at dictionary.com, available at https://web.archive.org/web/20221213223226/https://www.dictionary.com/ browse/database (archived on Dec. 13, 2022) (Year: 2022).
Joshi, Sagar, et al. "Investigating Strategies for Clause Recommendation." arXiv preprint arXiv:2301.10716 (Jan. 21, 2023), pp. 1-10 (Year: 2023).
Kolt, Noam. "Predicting consumer contracts." Berkeley Tech. LJ 37 (2022), pp. 71-138. (Year: 2022).
Lam, Kwok-Yan, et al. "Applying Large Language Models for Enhancing Contract Drafting." (Jun. 19, 2023), pp. 1-11 (Year: 2023).
Lewis, Patrick et al. Retrieval-Augmented Generation for Knowledge-Intensive NLP Tasks. Facebook AI Research, University College London; New York University; Apr. 12, 2021.
Phelps, Teresa, and Kevin Ashley. ""Alexa, Write a Memo": The Promise and Challenges of AI and Legal Writing." Legal Writing: J. Legal Writing Inst. 26 (2022), pp. 329-387 (Year: 2022).
Trummer, Immanuel. "CodexDB: Generating Code for Processing SOL Queries using GPT-3 Codex." arXiv preprint arXiv: 2204.08941 (2022), pp. 1-7 (Year: 2022).
Wang, Shuyue, and p. Jin. "A Brief Summary of Prompting in Using GPT Models." (Apr. 2023), pp. 1-14 (Year: 2023).
U.S. Appl. No. 18/169,707, Non Final Office Action mailed Apr. 19, 2024, 31 pgs.
U.S. Appl. No. 18/169,707, Notice of Allowance mailed Sep. 16, 2024, 21 pgs.
U.S. Appl. No. 18/362,733, Final Office Action mailed May 31, 2024, 46 pgs.
U.S. Appl. No. 18/362,733, Final Office Action mailed Feb. 20, 2025, 34 pgs.
U.S. Appl. No. 18/362,733, Non Final Office Action mailed Oct. 17, 2024, 33 pgs.
U.S. Appl. No. 18/515,014, Non Final Office Action mailed Jul. 2, 2024, 10 pgs.
U.S. Appl. No. 18/515,014, Notice of Allowance mailed Dec. 6, 2024, 11 pgs.
U.S. Appl. No. 18/515,025, Non Final Office Action mailed Aug. 23, 2024, 9 pgs.
U.S. Appl. No. 18/515,025, Notice of Allowance mailed Nov. 14, 2024, 13 pgs.
U.S. Appl. No. 18/640,591, Non Final Office Action mailed Nov. 7, 2024, 10 pgs.
U.S. Appl. No. 18/640,591, Non Final Office Action mailed Jan. 22, 2025, 8 pgs.
International Application Serial No. PCT/US23/84899, Preliminary Report on Patentability mailed Jun. 24, 2025, 8 pgs.
International Application Serial No. PCT/US23/84899, Search Report and Written Opinion mailed May 21, 2024, 12 pgs.
International Application Serial No. PCT/US23/84903, Search Report and Written Opinion mailed Apr. 26, 2024, 9 pgs.
International Application Serial No. PCT/US23/84905, Search Report and Written Opinion mailed Apr. 26, 2024, 10 pgs.
International Application Serial No. PCT/US23/84915, Search Report and Written Opinion mailed Apr. 24, 2024, 9 pgs.
International Application Serial No. PCT/US24/24021, Search Report and Written Opinion mailed May 16, 2024, 7 pgs.
International Application Serial No. PCT/US24/24038, Search Report and Written Opinion mailed Jul. 30, 2024, 21 pgs.
International Application Serial No. PCT/US24/24047, Search Report and Written Opinion mailed Jul. 24, 2024, 9 pgs.
International Application Serial No. PCT/US24/36934, Search Report and Written Opinion mailed Nov. 13, 2024, 11 pgs.
Ji Ziwei Zjiad@Connect UST HK et al: "Survey of Hallucination in Natural Language Generation", arxiv.org, Cornell University Library, 201 Olin Library Cornell University Ithaca, NY14853, vol. 55, No. 12, Mar. 3, 2023 (Mar. 3, 2023) pp. 1-38, XP058982776, DOI: 10.1145/3571730 abstract.
Ratner Nir et al: Parallel Context Windows for Large Language Models. Proceedings of the 61st Annual Meeting of the Association for Computational Linguistics (vol. 1: Long Papers), [online] Aug. 1, 2023 (Aug. 1, 2023), pp. 6383-6402, XP093214224, DOI: 10.18653/v1/2023.acl-long.352 Retrieved from the Internet: URL :https://arxiv.org/pdf/2212.10947> [retrieved on Oct. 11, 2024] the whole document.
Tianyu Gao et al: "Enabling Large Language Models to Generate Text with Citations", arxiv.org, Cornell University Library, 201 Olin Library Cornell University Ithaca, NY 14853, 24. May 2023 (May 24, 2023), XP091517228, abstract.
Trummer, Immanuel. "CodexDB: Generating Code for Processing QL Queries using GPT-3 Codex. "arXiv preprint arXiv: 2204.08941 (2022), pp. 1-7 (Year:2022).
Wang, Wenjin, et al. "Layout and task aware instruction prompt for zero-shot document image question answering." arXiv preprint arXiv:2306.00526 (Jun. 1, 2023), pp. 1-11 (Year: 2023).
Yue Xiang et al: "Automatic Evaluation of Attribution by Large Language Models", Findings of the Association for Computational Linguistics: EMNLP 2023, [Online] May 10, 2023 (May 10, 2023), pp. 4615-4635, XP093214168, DOI: 10. 18653/v1/2 023 .findings-emnlp.307 Retrieved from the Internet: URL:https://arxiv. org/pdf/2305. 06311v1> [retrieved on Oct. 11, 2024] the whole document.
Zhang, Yanzhe, et al. "Llavar: Enhanced visual instruction tuning for text-rich image understanding." arXiv preprint arXiv: 2306.17107 (Jun. 29, 2023), pp. 1-21 (Year: 2023).

* cited by examiner

QUERY EVALUATION IN NATURAL LANGUAGE PROCESSING SYSTEMS

CROSS-REFERENCE TO RELATED APPLICATIONS

This application is a continuation of U.S. patent application Ser. No. 18/362,738 by DeFoor et al., titled "QUERY EVALUATION IN NATURAL LANGUAGE PROCESSING SYSTEMS", filed Jul. 31, 2023, which claims the benefit under 35 U.S.C. § 119(e) of U.S. Provisional Patent Application 63/511,191 by DeFoor et al., titled "QUERY EVALUATION IN NATURAL LANGUAGE PROCESSING SYSTEMS", filed on Jun. 30, 2023, which is incorporated herein by reference in its entirety and for all purposes.

FIELD OF TECHNOLOGY

This patent document relates generally to natural language processing systems and more specifically to systems involving large language models.

BACKGROUND

Natural language processing systems are increasingly sophisticated. Large language models are pre-trained to generate text. A large language model may be provided with input text, such as a question. The model may then provide output text in response, such as an answer to the question. Recent advances have led large language models to become increasingly powerful, often able to produce text that approaches that which would be generated by humans.

Many applications of large language models are based on input documents. However, processing input documents can be slow and inefficient, even for large language models. Accordingly, improved systems and techniques for document processing are needed.

SUMMARY

Techniques and mechanisms described herein include methods, systems, and computer-readable media for text generation. In some embodiments, the techniques described herein relate to a method including: determining a plurality of relevance prompts based on a plurality of input documents and a relevance prompt template, each of the plurality of relevance prompts including a first respective portion of text from a respective input document of the plurality of input documents and a natural language query, each of the plurality of relevance prompts and the relevance prompt template including a first set of natural language instructions to determine a relevance score based on an evaluation of relevance of the respective portion of text to the natural language query; transmitting the plurality of relevance prompts to a large language model for completion; receiving from the large language model a first plurality of response messages corresponding with the plurality of relevance prompts, each of the first plurality of response messages including a respective designated chunk relevance score corresponding to the respective portion of text; selecting a subset of the plurality of input documents based on the respective designated chunk relevance scores; determining a plurality of query response prompts each including a second respective portion of text, the natural language query, and a second set of natural language instructions to address the natural language query based on the second respective portion of text; receiving from the large language model a second plurality of response messages, each of the second plurality of response messages including a respective intermediate answer to the natural language query; determining a response to the natural language query based on the intermediate answers; and transmitting the response to a remote computing device.

In some embodiments, each of the first plurality of response messages includes a respective completed relevance prompt that includes a first portion included in the corresponding relevance prompt.

In some embodiments, each of the first plurality of response messages includes a respective second portion that includes only the respective chunk relevance score, and the respective completed relevance prompt includes only the first portion and the second portion.

In some embodiments, each of the first plurality of response messages includes a respective second portion that includes only a respective plurality of chunk relevance scores including the respective designated chunk relevance score, and the respective completed relevance prompt includes only the first portion and the second portion.

In some embodiments, a document relevance score may be determined for a designated input document of the plurality of input documents based on a subset of the plurality of chunk relevance scores corresponding to respective text portions included in the designated input document. Determining the document relevance score may involve determining a maximum value among the subset of the plurality of chunk relevance scores, determining a weighted average of the subset of the plurality of chunk relevance scores, and/or determining the document relevance score involves determining a sum of the subset of the plurality of chunk relevance scores.

In some embodiments, each of the subset of the plurality of input documents includes a first respective portion of text having been assigned a respective designated chunk relevance score above a designated threshold.

BRIEF DESCRIPTION OF THE DRAWINGS

The included drawings are for illustrative purposes and serve only to provide examples of possible structures and operations for the disclosed inventive systems, apparatus, methods and computer program products for natural language processing. These drawings in no way limit any changes in form and detail that may be made by one skilled in the art without departing from the spirit and scope of the disclosed implementations.

DETAILED DESCRIPTION

Figure 1:
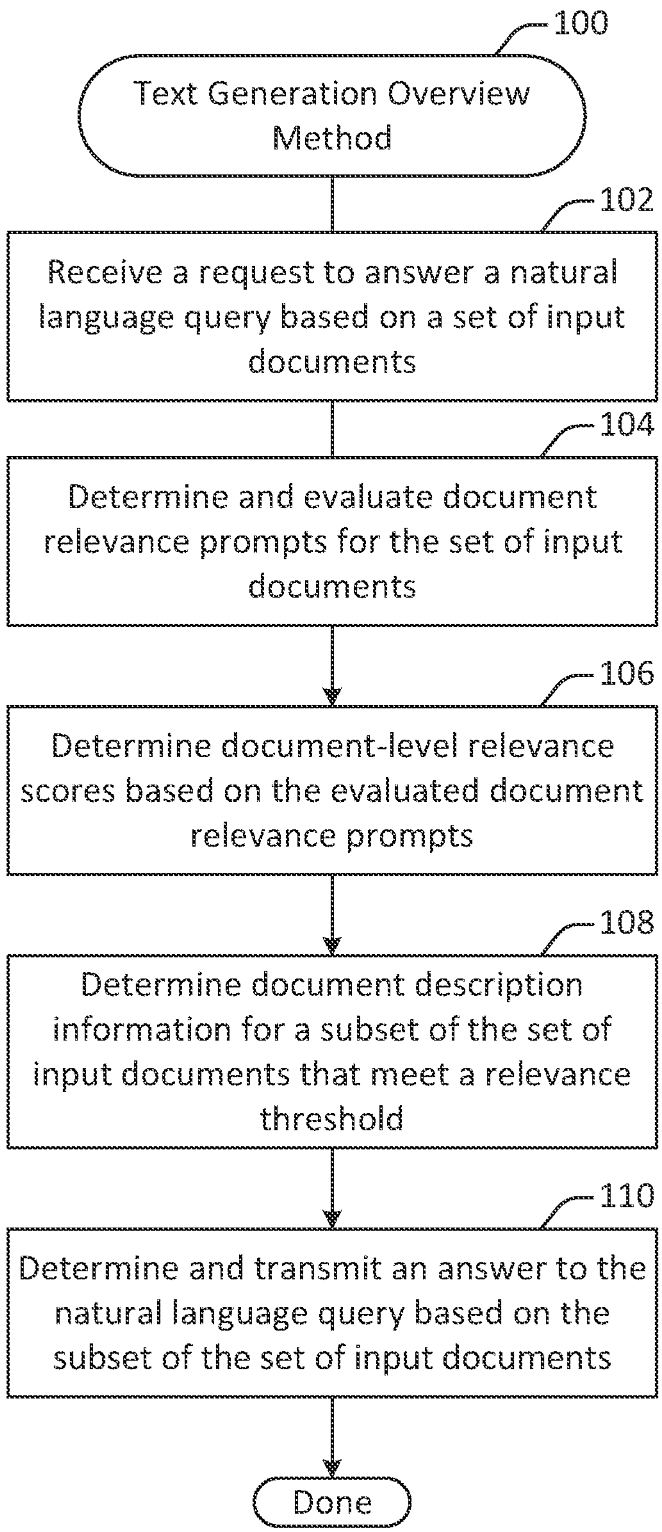
FIG. 1 illustrates an overview method for generating novel text, performed in accordance with one or more embodiments.

Techniques and mechanisms described herein provide for the evaluation of large volumes of documents. A set of documents may be evaluated for relevance against one or more questions by dividing the documents into portions and providing the portions to a large language model. The large language model may then score the document portions for relevance, and return input score values corresponding to the evaluation. The input score values may be combined to produce document-level scores. Documents meeting a relevance threshold may be optionally re-evaluated. Finally, documents deemed relevant may be used to address the original question or questions.

According to various embodiments, large language models may be used to answer questions based on input documents. However, the use of large language models can be relatively slow and expensive. Such issues are particularly problematic when evaluating large quantities (e.g., hundreds of thousands or millions of pages) of document text. Techniques and mechanisms described herein provide for a streamlined way to evaluate large quantities of documents. Accordingly, techniques and mechanisms described herein provide for improved efficiency in the operation of computing systems employing large language models, allowing them to complete a task faster and with fewer computing resources.

According to various embodiments, techniques and mechanisms described herein provide for novel text generation in domain-specific contexts. A text generation interface system may take as input one or more arbitrary documents, process them via optical text recognition, segment them into portions, and process the segmented text via various tasks based on need. Different workflows are provided for different tasks, and this application describes a number of examples of such workflows. In many workflows, an input document is divided into chunks via a chunking technique. Then, chunks are inserted into prompt templates for processing by a large language model such as the GPT-3 or GPT-4 available from OpenAI. The large language model's response is then parsed and potentially used to trigger additional analysis, such as one or more database searches, one or more additional prompts sent back to the large language model, and/or a response returned to a client machine.

According to various embodiments, techniques and mechanisms described herein provide for a sophisticated document processing pipeline. The pipeline receives one or more input documents, identifies text that should be kept together, identifies extraneous text such as headers, footers, and line numbers, and segments the text accordingly. In this way, the quality of the text provided to the rest of the system is improved.

According to various embodiments, techniques and mechanisms described herein provide for new approaches to text segmentation. Large language models often receive as input a portion of input text and generate in response a portion of output text. In many systems, the large language model imposes a limit on the input text size. Accordingly, in the event that the large language model is asked to summarize a length document, the document may need to be segmented into portions in order to achieve the desired summarization.

Conventional text segmentation techniques frequently create divisions in text that negatively affect the performance of the model, particularly in domains-specific contexts such as law. For example, consider a caption page of a legal brief, which includes text in a column on the left that encompasses the parties, text in a column on the right that includes the case number, a title that follows lower on the page, and line numbering on the left. In such a configuration, the text in the different columns should not be mixed and should be treated separately from the line numbers, while both columns should precede the document title, when converting the document to an input query for a large language model. However, conventional techniques would result in these semantically different elements of text being jumbled together, resulting in an uninformative query provided to the large language model and hence a low-quality response. In contrast to these conventional techniques, techniques and mechanisms described herein provide for a pipeline that cleans such raw text so that it can be provided to a large language model.

According to various embodiments, techniques and mechanisms described herein provide for the division of text into chunks, and the incorporation of those chunks into prompts that can be provided to a large language model. For instance, a large language model may impose a limit of, for instance, 8,193 tokens on a task, including text input, text output, and task instructions. In order to process longer documents, the system may split them. However, splitting a document can easily destroy meaning depending on where and how the document is split. Techniques and mechanisms described herein provide for evenly splitting a document or documents into chunks, and incorporating those chunks into prompts, in ways that retain the semantic content associated with the raw input document or documents.

In some embodiments, techniques and mechanisms described herein may be applied to generate novel text in domain-specific contexts, such as legal analysis. Large language models, while powerful, have a number of drawbacks when used for technical, domain-specific tasks. When using conventional techniques, large language models often invent "facts" that are actually not true. For instance, if asked to summarize the law related to non-obviousness in the patent context, a large language model might easily invent a court case, complete with caption and ruling, that in fact did not occur. In contrast to conventional techniques, techniques and mechanisms described herein provide for the generation of novel text in domain-specific contexts while avoiding such drawbacks.

According to various embodiments, techniques and mechanisms described herein may be used to automate complex, domain-specific tasks that were previously the sole domain of well-trained humans. Moreover, such tasks may be executed in ways that are significantly faster, less expensive, and more auditable than the equivalent tasks performed by humans. For example, a large language model may be employed to produce accurate summaries of legal texts, to perform legal research tasks, to generate legal documents, to generate questions for legal depositions, and the like.

In some embodiments, techniques and mechanisms described herein may be used to divide text into portions while respecting semantic boundaries and simultaneously reducing calls to the large language model. The cost of using many large language models depends on the amount of input and/or output text. Accordingly, techniques and mechanisms described herein provide for reduced overhead associated with prompt instructions while at the same time providing for improved model context to yield an improved response.

In some embodiments, techniques and mechanisms described herein may be used to process an arbitrary number of unique documents (e.g., legal documents) that cannot be accurately parsed and processed via existing optical character recognition and text segmentation solutions.

In some embodiments, techniques and mechanisms described herein may be used to link a large language model with a legal research database, allowing the large language model to automatically determine appropriate searches to perform and then ground its responses to a source of truth (e.g., in actual law) so that it does not "hallucinate" a response that is inaccurate.

In some embodiments, techniques and mechanisms described herein provide for specific improvements in the legal domain. For example, tasks that were previously too laborious for attorneys with smaller staffs may now be more easily accomplished. As another example, attorneys may automatically analyze large volumes of documents rather than needing to perform such tasks manually. As another example, text chunking may reduce token overhead and hence cost expended on large language model prompts. As yet another example, text chunking may reduce calls to a large language model, increasing response speed. As still another example, text chunking may increase and preserve context provided to a large language model by dividing text into chunks in semantically meaningful ways.

According to various embodiments, techniques and mechanisms described herein may provide for automated solutions for generated text in accordance with a number of specialized applications. Such applications may include, but are not limited to: simplifying language, generating correspondence, generating a timeline, reviewing documents, editing a contract clause, drafting a contract, performing legal research, preparing for a depositions, drafting legal interrogatories, drafting requests for admission, drafting requests for production, briefing a litigation case, responding to requests for admission, responding to interrogatories, responding to requests for production, analyzing cited authorities, and answering a complaint.

FIG. 1 illustrates an overview method 100 for generating novel text, performed in accordance with one or more embodiments. In some implementations, the method 100 may be performed at a text generation interface system such as the system 200 shown in FIG. 2. For instance, the method 100 may be performed at the text generation interface system 210.

A request to answer a natural language query based on a set of input documents is received at 102. According to various embodiments, the request may be received via a communication interface. The request may be transmitted via a chat session, an application procedure interface (API) call, or any other suitable mechanism.

In some embodiments, the request may include one or more questions and/or topics to be evaluated. The request may also indicate a set of input documents against which to evaluate the one or more questions and/or topics.

A set of document relevance prompts are determined and evaluated for the set of input documents at 104. According to various embodiments, determining the document relevance prompts may involve preprocessing the text to perform operations such as parsing, tokenizing, sharding, and chunking. Additional details regarding such pre-processing operations are discussed with respect to FIGS. 3-6.

In some embodiments, determining the document relevance prompts may involve combining a document relevance prompt template with portions of the input documents. The document relevance prompts may then be completed by a large language model, and the completed prompts can then be parsed to determine chunk-level relevance scores. Additional details regarding such operations are discussed with respect to the method 900 shown in FIG. 9.

Document-level relevance scores are determined at 106 based on the evaluated document relevance prompts. In some embodiments, a document-level relevance score may be determined as the maximum of chunk-level relevance scores for the documents. Additional details regarding the determination of document-level relevance scores are discussed with respect to the method 900 shown in FIG. 9.

At 108, document description information is optionally determined for a subset of the set of input documents that meet a relevance threshold. In some embodiments, documents deemed sufficiently relevant may be re-analyzed by the large language model to determine a natural language description as to why the relevant document was deemed relevant.

An answer to the natural language query is determined and transmitted at 110. In some embodiments, determining an answer to the natural language query may involve determining one or more question document evaluation prompts, which may be evaluated by a large language model. Once completed, these question document evaluation prompts may be parsed to determine answer inputs, which may then be combined into a single query response. Additional details regarding the determination and transmission of the answer to the natural language query are discussed with respect to the method 1100 shown in FIG. 11.

Figure 2:
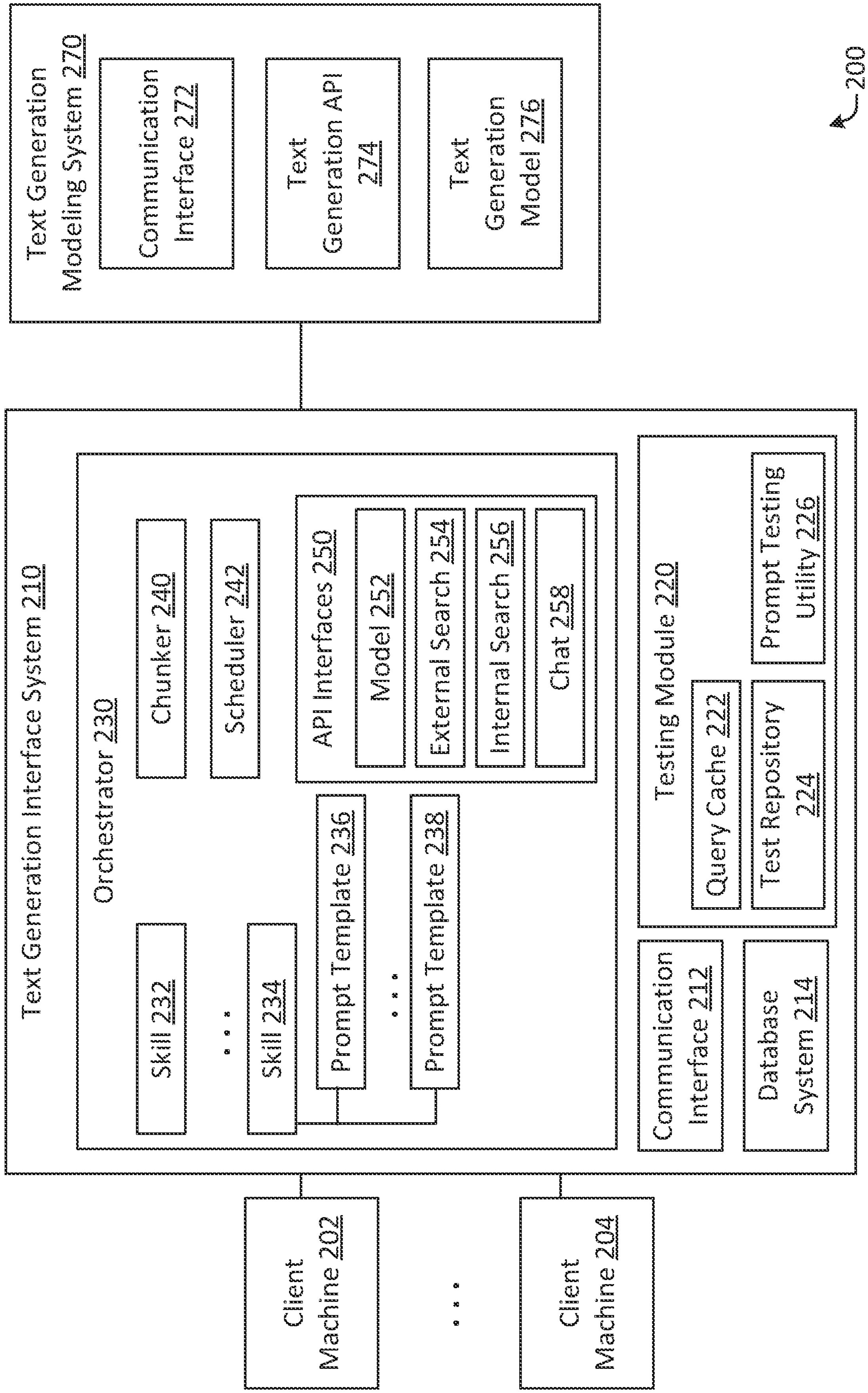
FIG. 2 illustrates a text generation system, configured in accordance with one or more embodiments.

FIG. 2 illustrates a text generation system 200, configured in accordance with one or more embodiments. The text generation system 200 includes client machines 202 through 204 in communication with a text generation interface system 210, which in turn is in communication with a text generation modeling system 270. The text generation modeling system 270 includes a communication interface 272, a text generation API 274, and a text generation model 276. The text generation interface system 210 includes a communication interface 212, a database system 214, a testing module 220, and an orchestrator 230. The testing module 220 includes a query cache 222, a test repository 224, and a prompt testing utility 226. The orchestrator 230 includes skills 232 through 234, and prompt templates 236 through 238. The orchestrator also includes a chunker 240 and a scheduler 242. The orchestrator also includes API interfaces 250, which include a model interface 252, an external search interface 254, an internal search interface 256, and a chat interface 258.

According to various embodiments, a client machine may be any suitable computing device or system. For instance, a client machine may be a laptop computer, desktop computer, mobile computing device, or the like. Alternatively, or additionally, a client machine may be an interface through which multiple remote devices communicate with the text generation interface system 210.

According to various embodiments, a client machine may interact with the text generation interface system in any of various ways. For example, a client machine may access the text generation interface system via a text editor plugin, a dedicated application, a web browser, other types of interactions techniques, or combinations thereof.

According to various embodiments, the text generation modeling system 270 may be configured to receive, process, and respond to requests via the communication interface 272, which may be configured to facilitate communications via a network such as the internet.

In some embodiments, some or all of the communication with the text generation modeling system 270 may be conducted in accordance with the text generation API 274, which may provide remote access to the text generation model 276. The text generation API 274 may provide functionality such as defining standardized message formatting, enforcing maximum input and/or output size for the text generation model, and/or tracking usage of the text generation model.

According to various embodiments, the text generation model 276 may be a large language model. The text generation model 276 may be trained to predict successive words in a sentence. It may be capable of performing functions such as generating correspondence, summarizing text, and/or evaluating search results. The text generation model 276 may be pre-trained using many gigabytes of input text and may include billions or trillions of parameters.

In some embodiments, large language models impose a tradeoff. A large language model increases in power with the number of parameters and the amount of training data used to train the model. However, as the model parameters and input data increase in magnitude, the model's training cost, storage requirements, and required computing resources increase as well. Accordingly, the large language model may be implemented as a general-purpose model configured to generate arbitrary text. The text generation interface system 210 may serve as an interface between the client machines and the text generation modeling system 270 to support the use of the text generation modeling system 270 for performing complex, domain-specific tasks in fields such as law. That is, the text generation interface system 210 may be configured to perform one or more methods described herein.

According to various embodiments, the orchestrator 230 facilitates the implementation of one or more skills, such as the skills 232 through 234. A skill may act as a collection of interfaces, prompts, actions, data, and/or metadata that collectively provide a type of functionality to the client machine. For instance, a skill may involve receiving information from a client machine, transmitting one or more requests to the text generation modeling system 270, processing one or more response received form the text generation modeling system 270, performing one or more searches, and the like. Skills are also referred to herein as text generation flows.

In some embodiments, a skill may be associated with one or more prompts. For instance, the skill 234 is associated with the prompt templates 236 and 238. A prompt template may include information such as instructions that may be provided to the text generation modeling system 270. A prompt template may also include one or more fillable portions that may be filled based on information determined by the orchestrator 230. For instance, a prompt template may be filled based on information received from a client machine, information returned by a search query, or another information source.

In some implementations, the chunker 240 is configured to divide text into smaller portions. Dividing text into smaller portions may be needed at least in part to comply with one or more size limitations associated with the text. For instance, the text generation API 274 may impose a maximum size limit on prompts provided to the text generation model 276. The chunker may be used to subdivide text included in a request from a client, retrieved from a document, returned in a search result, or received from any other source.

According to various embodiments, the API interfaces 250 include one or more APIs for interacting with internal and/or external services. The model interface 252 may expose one or more functions for communicating with the text generation modeling system 270. For example, the model interface 252 may provide access to functions such as transmitting requests to the text generation modeling system 270, receiving responses from the text generation modeling system 270, and the like.

In some embodiments, the external search interface 254 may be used to search one or more external data sources such as information repositories that are generalizable to multiple parties. For instance, the external search interface 254 may expose an interface for searching legal case law and secondary sources.

In some implementations, the internal search interface 256 may facilitate the searching of private documents. For instance, a client may upload or provide access to a set of private documents, which may then be indexed by the text generation interface system 210.

According to various embodiments, the chat interface 258 may facilitate text-based communication with the client machines. For instance, the chat interface 258 may support operations such as parsing chat messages, formulating responses to chat messages, identifying skills based on chat messages, and the like. In some configurations, the chat interface 258 may orchestrate text-based chat communication between a user at a client machine and the text generation model 276, for instance via web sockets.

In some embodiments, the query cache 222 may store queries such as testing queries sent to the text generation modeling system 270. Then, the query cache 222 may be instructed to return a predetermined result to a query that has already been sent to the text generation modeling system 270 rather than sending the same query again.

In some embodiments, the prompt testing utility 226 is configured to perform operations such as testing prompts created based on prompt templates against tests stored in the test repository 224.

In some embodiments, the communication interface 212 is configured to facilitate communications with the client machines and/or the text generation modeling system 270 via a network such as the internet. The scheduler 242 may be responsible for scheduling one or more tasks performed by the text generation interface system 210. For instance, the scheduler may schedule requests for transmission to the text generation modeling system 270.

In some embodiments, the database system 214 is configured to store information determined based on natural language. For example, the database system 214 may be configured to store one or more database tables that include fields corresponding with information extracted from natural language documents. As another example, the database system 214 may be configured to store metadata information about documents based on information extracted from those documents. As yet another example, the database system 214 may be configured to store linkages between documents and document portions.

According to various embodiments, the database system 214 may be configured using any of a variety of suitable database technologies. For instance, the database system 214 may be configured as a relational database system, a non-relational database system, or any other type of database system capable of supporting the storage and querying of information described herein.

Figure 3:
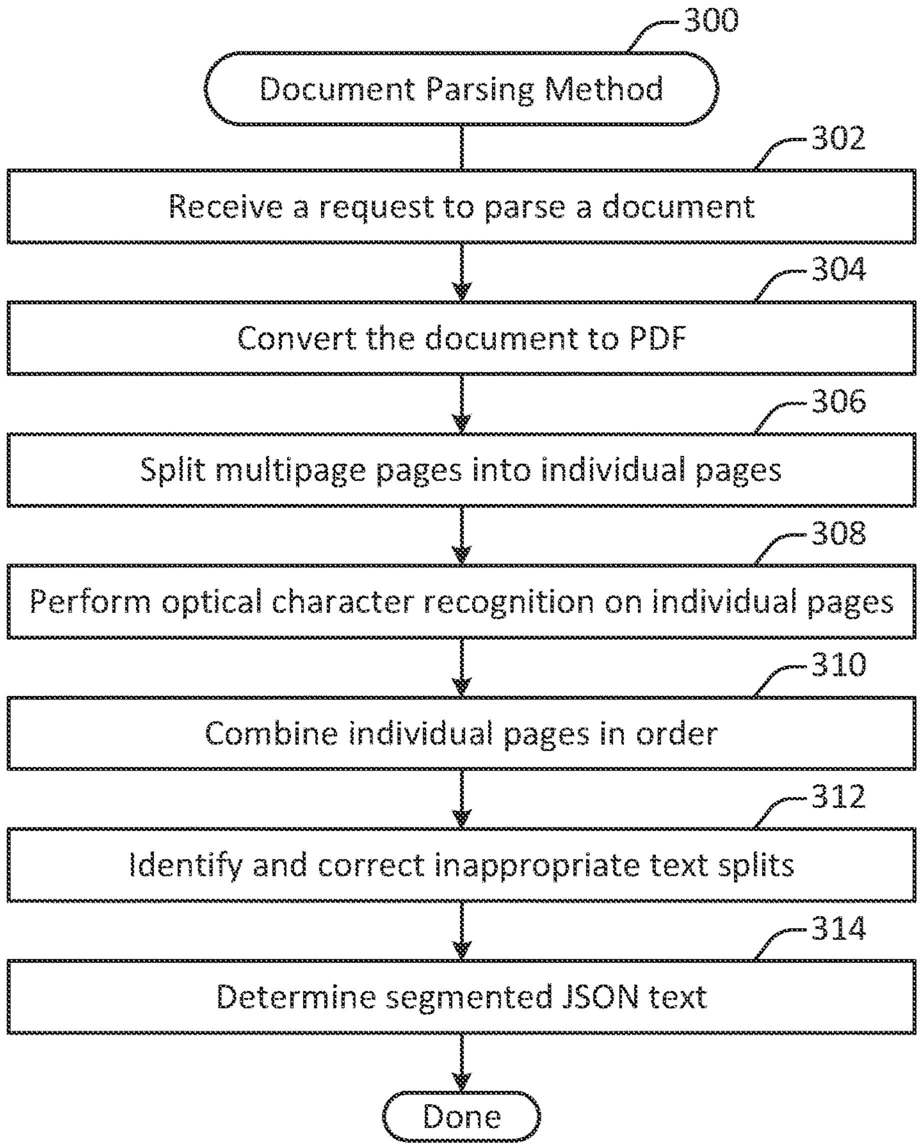
FIG. 3 illustrates a document parsing method, performed in accordance with one or more embodiments.

FIG. 3 illustrates a document parsing method 300, performed in accordance with one or more embodiments. According to various embodiments, the method 300 may be performed on any suitable computing system. For instance, the method 300 may be performed on the text generation interface system 230 shown in FIG. 2. The method 300 may be performed in order to convert a document into usable text while at the same time retaining metadata information about the text, such as the page, section, and/or document at which the text was located.

A request to parse a document is received at 302. In some embodiments, the request to parse a document may be generated when a document is identified for analysis. For example, as discussed herein, a document may be uploaded or identified by a client machine as part of communication with the text generation interface system 230. As another example, a document may be returned as part of a search result.

The document is converted to portable document format (PDF) or another suitable document format at 304. In some embodiments, the document need only be converted to PDF if the document is not already in the PDF format. Alternatively, PDF conversion may be performed even on PDFs to ensure that PDFs are properly formatted. PDF conversion may be performed, for instance, by a suitable Python library or the like. For instance, PDF conversion may be performed with the Hyland library.

Multipage pages are split into individual pages at 306. In some implementations, multipage pages may be split into individual pages via a machine learning model. The machine learning model may be trained to group together portions of text on a multipage page. For instance, a caption page in a legal decision may include text in a column on the left that encompasses the parties, text in a column on the right that includes the case number, a title that follows lower on the page, and line numbering on the left. In such a configuration, the machine learning model may be trained to treat separately the text in the different columns, and to separate the text from the line numbers. The document title may be identified as a first page, with the left column identified as the second page and the right column identified as the third page.

Optical character recognition is performed on individual pages or on the document as a whole at 308. In some implementations, optical character recognition may be performed locally via a library. Alternatively, optical character recognition may be performed by an external service. For instance, documents or pages may be sent to a service such as Google Vision. Performing optical character recognition on individual pages may provide for increased throughout via parallelization.

Individual pages are combined in order at 310. In some implementations, combining pages in order may be needed if optical character recognition were applied to individual pages rather than to the document as a whole.

Inappropriate text splits are identified and corrected at 312. In some embodiments, inappropriate text splits include instances where a paragraph, sentence, word, or other textual unit was split across different pages. Such instances may be identified by, for example, determining whether the first textual unit in a page represents a new paragraph, sentence, word, or other unit, or if instead it represents the continuation of a textual unit from the previous page. When such a split is identified, the continuation of the textual unit may be excised from the page on which it is located and moved to the end of the previous page. Such an operation may be performed by, for instance, the Poppler library available in Python.

Segmented JSON text is determined at 314. In some embodiments, the segmented JSON text may include the text returned by the optical character recognition performed at operation 308. In addition, the segmented JSON text may include additional information, such as one or more identifiers for the page, section, and/or document on which the text resides. The output of the segmented JSON may be further processed, for instance via the text sharding method 500 shown in FIG. 5 and/or the text chunking method 600 shown in FIG. 6.

Figure 4:
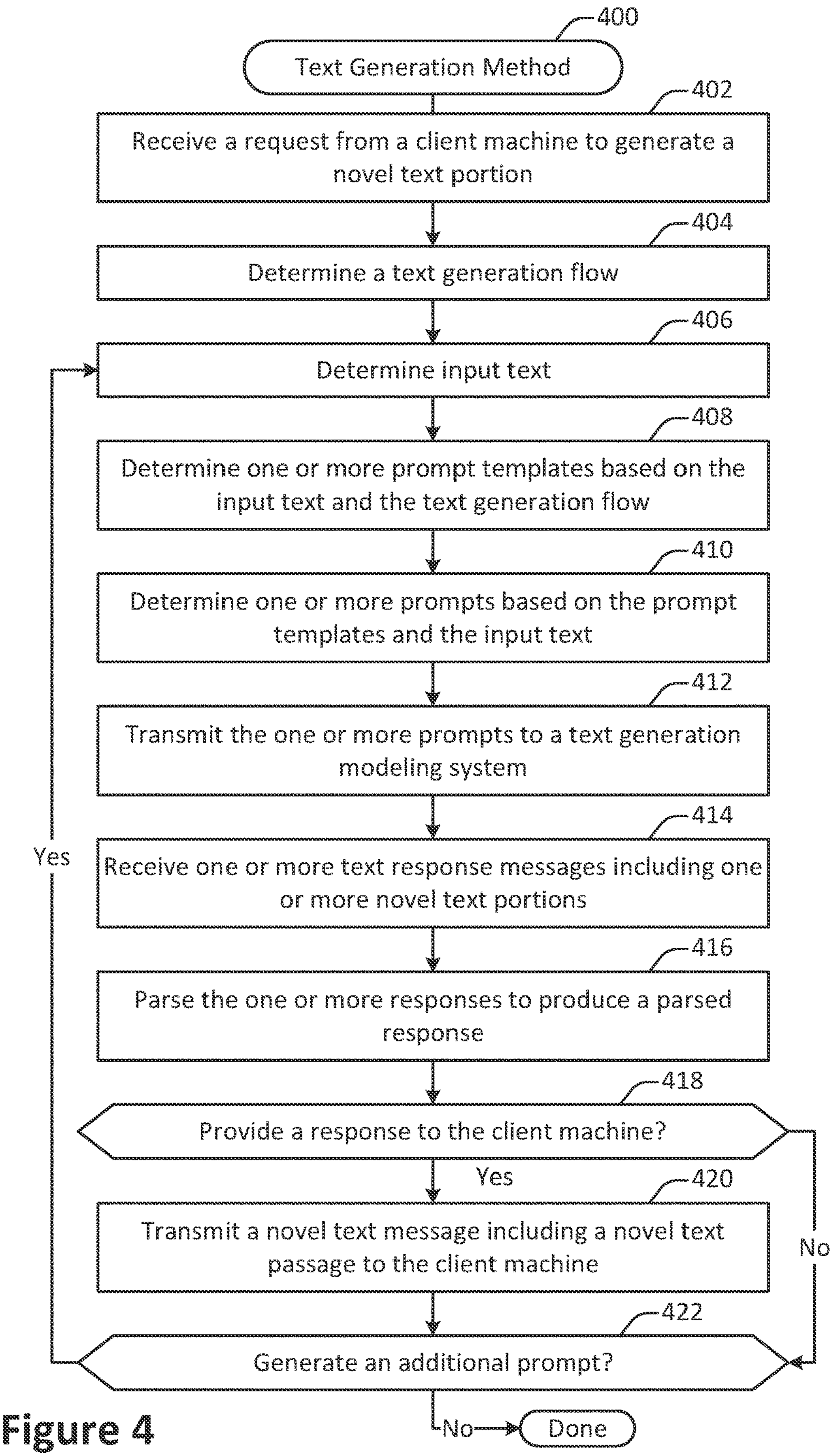
FIG. 4 illustrates a text generation method, performed in accordance with one or more embodiments.

FIG. 4 illustrates a text generation method 400, performed in accordance with one or more embodiments. According to various embodiments, the method 400 may be performed on any suitable computing system. For instance, the method 400 may be performed on the text generation interface system 230 shown in FIG. 2. The method 400 may be performed in order to identify and implement a text generation flow based on input text.

A request from a client machine to generate a novel text portion is received at 402. In some embodiments, the request may include a query portion. The query portion may include natural language text, one or more instructions in a query language, user input in some other format, or some combination thereof. For instance, the query portion may include an instruction to "write an email", "summarize documents", or "research case law".

In some embodiments, the request may include an input text portion. For example, the request may link to, upload, or otherwise identify documents. As another example, the request may characterize the task to be completed. For instance, the request may discuss the content of the desired email or other correspondence. The particular types of input text included in the request may depend in significant part on the type of request. Accordingly, many variations are possible.

A text generation flow is determined at 404. In some embodiments, the text generation flow may be explicitly indicated as part of the request received from the client machine. For instance, the client machine may select a particular text generation flow from a list. Alternatively, the text generation flow may be determined at least in part by analyzing the request received from the client machine. For example, the request may be analyzed to search for keywords or other indications that a particular text generation flow is desired. As another example, all or a portion of the request may be provided to a machine learning model to predict the requested text generation flow. In some configurations, a predicted text generation flow may be provided to the client machine for confirmation before proceeding.

Input text is determined at 406. In some embodiments, the input text may be determined by applying one or more text processing, search, or other operations based on the request received from the client machine. For example, the input text may be determined at least in part by retrieving one or more documents identified in or included with the request received from the client machine. As another example, the input text may be determined at least in part by applying one or more natural language processing techniques such as cleaning or tokenizing raw text.

In some embodiments, determining input text may involve executing a search query. For example, a search of a database, set of documents, or other data source may be executed based at least in part on one or more search parameters determined based on a request received from a client machine. For instance, the request may identify one or more search terms and a set of documents to be searched using the one or more search terms.

In some embodiments, determining input text may involve processing responses received from a text generation modeling system. For instance, all or a portion of the results from an initial request to summarizing a set of text portions may then be used to create a new set of more compressed input text, which may then be provided to the text generation modeling system for further summarization or other processing.

One or more prompt templates are determined at 408 based on the input text and the text generation flow. As discussed with respect to FIG. 2, different text generation flows may be associated with different prompt templates. Prompt templates may be selected from the prompt library based on the particular text generation flow.

At 410, one or more prompts based on the prompt templates are determined. In some embodiments, a prompt may be determined by supplementing and/or modifying a prompt template based on the input text. For instance, a portion of input text may be added to a prompt template at an appropriate location. As one example, a prompt template may include a set of instructions for causing a large language model to generate a correspondence document. The prompt template may be modified to determine a prompt by adding a portion of input text that characterizes the nature of the correspondence document to be generated. The added input text may identify information such as the correspondence recipient, source, topic, and discussion points.

The one or more prompts are transmitted to a text generation modeling system at 412. In some embodiments, the text generation modeling system may be implemented at a remote computing system. The text generation modeling system may be configured to implement a text generation model. The text generation modeling system may expose an application procedure interface via a communication interface accessible via a network such as the internet.

One or more text response messages are received from the remote computing system at 414. According to various embodiments, the one or more text response messages include one or more novel text portions generated by a text generation model implemented at the remote computing system. The novel text portions may be generated based at least in part on the prompt received at the text generation modeling system, including the instructions and the input text.

The one or more responses are parsed at 416 to produce a parsed response. In some embodiments, parsing the one or more responses may involve performing various types of processing operations. For example, in some systems a large language model may be configured to complete a prompt. Hence, a response message received from the large language model may include the instructions and/or the input text. Accordingly, the response message may be parsed to remove the instructions and/or the input text.

In some implementations, parsing the one or more responses may involve combining text from different responses. For instance, a document may be divided into a number of portions, each of which is summarized by the large language model. The resulting summaries may then be combined to produce an overall summary of the document.

A determination is made at 418 as to whether to provide a response to the client machine. In some embodiments, the determination made at 418 may depend on the process flow. For example, in some process flows, additional user input may be solicited by providing a response message determined based at least in part on one or more responses received from the text generation modeling system. As another example, in some process flows, a parsed response message may be used to produce an output message provided to the client machine.

If a response is to be provided to the client machine, then a client response message including a novel text passage is transmitted to the client machine at 420. In some embodiments, the client response message may be determined based in part on the text generation flow determined at 404 and in part based on the one or more text response messages received at 414 and parsed at 416.

A determination is made at 422 as to whether to generate an additional prompt. According to various embodiments, the determination as to whether to generate an additional prompt may be made based in part on the text generation flow determined at 404 and in part based on the one or more text response messages received at 414 and parsed at 416. As a simple example, a text generation flow may involve an initial set of prompts to summarize a set of portions, and then another round of interaction with the text generation modeling system to produce a more compressed summary.

According to various embodiments, the operations shown in FIG. 4 may be performed in an order different from that shown. Alternatively, or additionally, one or more operations may be omitted, and/or other operations may be performed. For example, a text generation flow may involve one or more search queries executed outside the context of the text generation modeling system. As another example, a text generation flow may involve one or more processes for editing, cleaning, or otherwise altering text in a manner not discussed with respect to FIG. 4. Various operations are possible.

Figure 5:
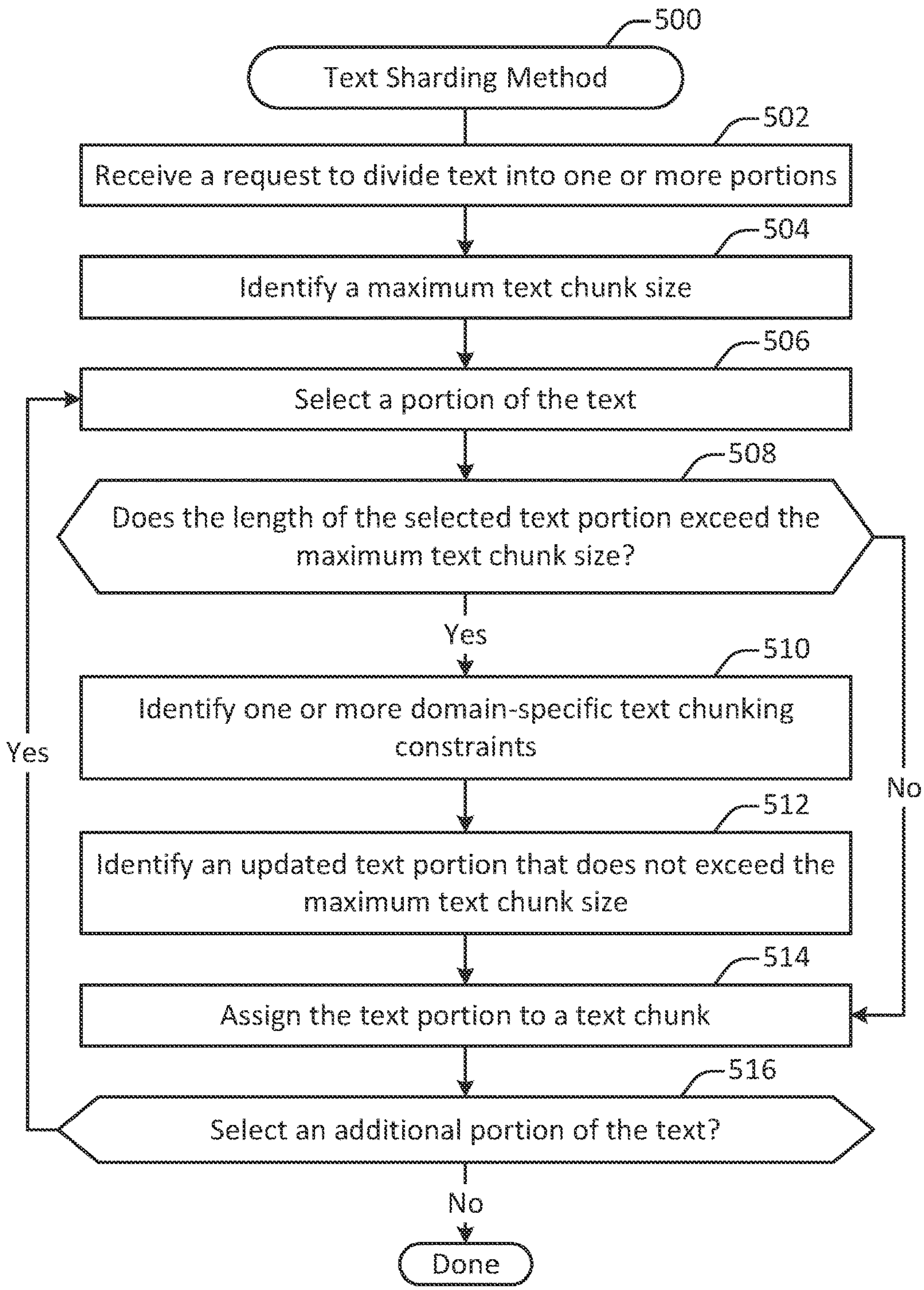
FIG. 5 illustrates a method of sharding text, performed in accordance with one or more embodiments.

FIG. 5 illustrates a method 500 of sharding text, performed in accordance with one or more embodiments. According to various embodiments, the method 500 may be performed on any suitable computing system. For instance, the method 500 may be performed on the text generation interface system 230 shown in FIG. 2. The method 500 may be performed in order to divide a body of text into potentially smaller units that fall beneath a designated size threshold, such as a size threshold imposed by an interface providing access to a large language model. For instance, a text generation modeling system implementing a large language model may specify a size threshold in terms of a number of tokens (e.g., words). As one example of such a threshold, a text generation modeling system may impose a limit of 8,193 tokens per query.

In particular embodiments, a size threshold may be adjusted based on considerations apart from a threshold imposed by an external text generation modeling system. For instance, a text generation interface system may formulate a prompt that includes input text as well as metadata such as one or more instructions for a large language model. In addition, the output of the large language model may be included in the threshold. If the external text generation modeling system imposes a threshold (e.g., 8,193 tokens), the text generation interface system 230 may need to impose a somewhat lower threshold when dividing input text in order to account for the metadata included in the prompt and/or the response provided by the large language model.

A request to divide text into one or more portions is received at 502. According to various embodiments, the request may be received as part of the implementation of one or more of the workflows shown herein. The request may identify a body of text. The body of text may include one or more documents, search queries, instruction sets, search results, and/or any other suitable text. In some configurations, a collection of text elements may be received. For instance, a search query and a set of documents returned by the search query may be included in the text.

In some implementations, text may be pre-divided into a number of different portions. Examples of divisions of text into portions may include, but are not limited to: lists of documents, documents, document sections, document pages, document paragraphs, and document sentences. Alternatively, or additionally, text may be divided into portions upon receipt at the text generation interface system 230. For instance, text may be divided into a set of portions via a text chunker, document parser, or other natural language processing tool.

A maximum text chunk size is identified at 504. In some embodiments, the maximum text chunk size may be identified based on one or more configuration parameters. In some configurations, the maximum text size may be imposed by the text generation interface system 230. Alternatively, or additionally, a size threshold may be imposed by an interface providing access to a large language model. As one example of a maximum text chunk size may be 100 kilobytes of text, 1 megabyte of text, 10 megabytes of text, or any other suitable chunk size.

A portion of the text is selected at 506. In some embodiments, as discussed herein, text may be pre-divided into text portion. Alternatively, or additionally, text may be divided into text portions as part of, or prior to, the operation of the method 500. As still another possibility, text may not be divided into portions. In such a configuration, the initial portion of text that is selected may be the entirety of the text. Then, the identification of one or more updated text portions at 512 may result in the division of the text into one or more portions as part of the operation of the method 500.

A determination is made at 508 as to whether the length of the selected text portion exceeds the maximum text chunk size. In some embodiments, the determination may be made by computing a length associated with the selected text portion and then comparing it with the maximum text chunk size. The calculation of the length associated with the selected text portion may be performed in different ways, depending on how the maximum text chunk size is specified. For instance, the maximum text chunk size may be specified as a memory size (e.g., in kilobytes or megabytes), as a number of words, or in some other fashion.

If it is determined that the length of the selected text portion exceeds the maximum text chunk size, then at 510 one or more domain-specific text chunking constraints are identified. In some embodiments, domain-specific text chunking constraints may be identified based on one or more pre-determined configuration parameters. For example, one domain-specific text chunking constraint may discourage division of a question and answer in a deposition transcript or other question/answer context. As another example, a domain-specific text chunking constraint may discourage splitting of a contract clause. As yet another example, a domain-specific text chunking constraint may discourage splitting of a minority and majority opinion in a legal opinion.

An updated text portion that does not exceed the maximum text chunk size is identified at 512. In some embodiments, the updated text portion may be determined by applying a more granular division of the text portion into small portions. For example, a document may be divided into sections, pages, or paragraphs. As another example, a document page or section may be divided into paragraphs. As another example, a paragraph may be divided into sentences. As still another example, a sentence may be divided into words. In particular embodiments, the updated text portion may be the sequentially first portion of the selected text portion that falls below the maximum text chunk size threshold identified at operation 504.

The text portion is assigned to a text chunk at 514. In some embodiments, the text may be associated with a sequence of text chunks. The text portions selected at 506 and identified at 512 may be assigned to these text chunks, for instance in a sequential order. That is, text portions near to one another in the text itself may be assigned to the same text chunk where possible to reduce the number of divisions between semantically similar elements of the text.

In particular embodiments, some attention may be paid to text divisions such as document, document section, paragraph, and/or sentence borders when assigning text portions to chunks. For instance, text portions belonging to the same document, document section, paragraph, and/or sentence may be grouped together when possible to ensure semantic continuity.

Figure 6:
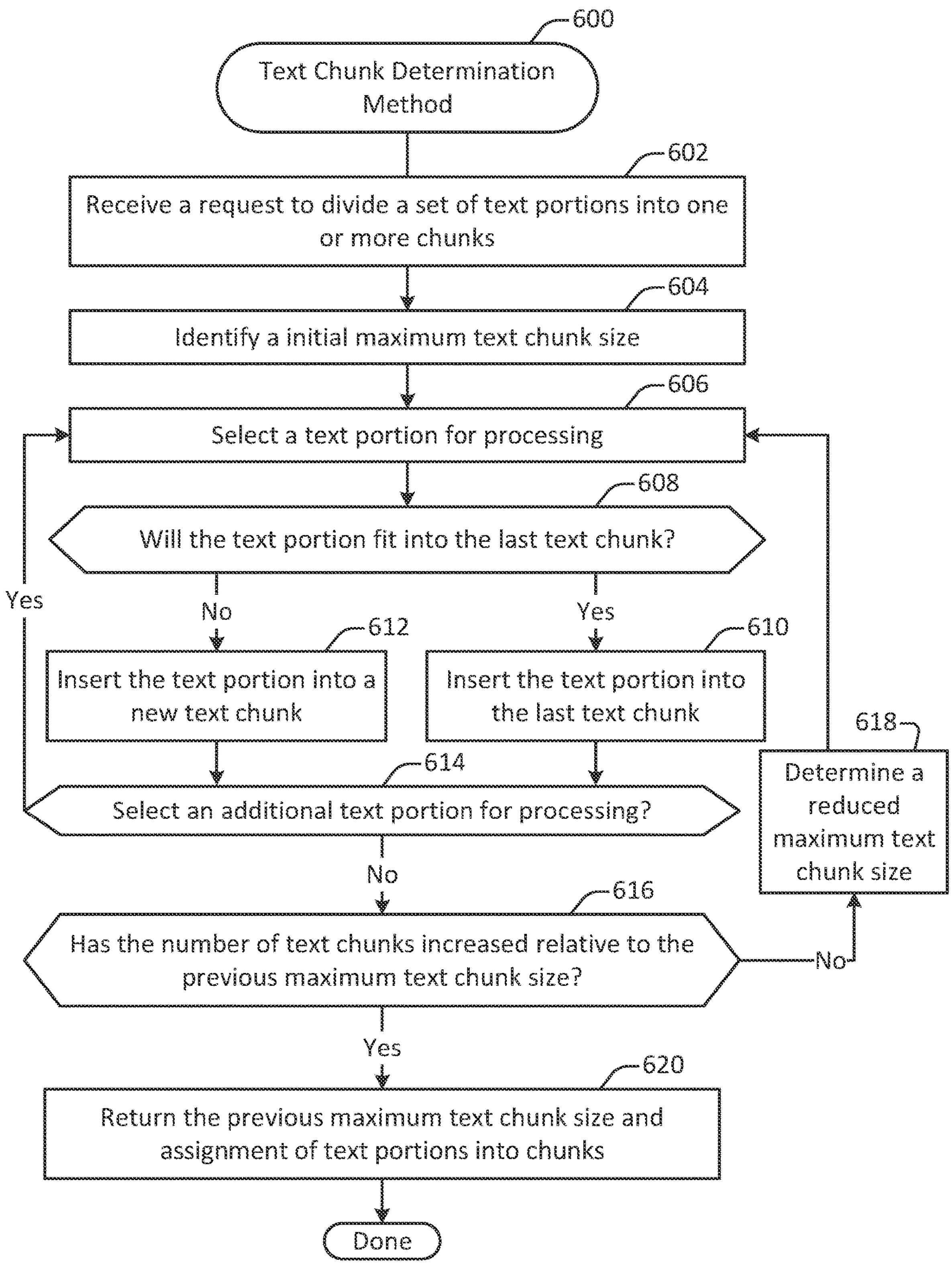
FIG. 6 illustrates a method for determining a text chunk, performed in accordance with one or more embodiments.

In particular embodiments, the method 500 may be performed in conjunction with the method 600 shown in FIG. 6. In such a configuration, operation 514 may be omitted. Alternatively, the assignment of text portions into text chunks in operation 514 may be treated as provisional, subject to subsequent adjustment via the method 600 shown in FIG. 6.

In some implementations, the identification of an updated text portion may result in the creation of two or more new text portions as a consequence of the division. In this case, the updated text portion may be assigned to a text chunk at 514, while the remainder portion or portions may be reserved for later selection at 506. Alternatively, or additionally, if two or more of the text portions resulting from the division at 512 each fall below the maximum text chunk size, then each of these may be assigned to a text chunk or chunks at operation 514.

A determination is made at 516 as to whether to select an additional portion of the text. According to various embodiments, additional portions of the text may continue to be selected as long as additional portions are available, or until some other triggering condition is met. For example, the system may impose a maximum amount of text for a particular interaction. As another example, the amount of text may exceed a designated threshold, such as a cost threshold.

FIG. 6 illustrates a text chunk determination method 600, performed in accordance with one or more embodiments.

According to various embodiments, the method 600 may be performed on any suitable computing system. For instance, the method 600 may be performed on the text generation interface system 230 shown in FIG. 2. The method 600 may be performed in order to assign a set of text portions into text chunks.

In some embodiments, the method 600 may be used to compress text portions into text chunks of smaller size. For instance, the method 600 may receive as an input a set of text portions divided into text chunks of highly variable sizes, and then produce as an output a division of the same text portions into the same number of text chunks, but with the maximum text chunk size being lower due to more even distribution of text portions across text chunks.

A request is received at 602 to divide a set of text portions into one or more chunks. In some embodiments, the request may be automatically generated, for instance upon completion of the method 500 shown in FIG. 5. The request may identify, for instance, a set of text portions to divide into text chunks.

An initial maximum text chunk size is identified at 604. In some embodiments, the initial maximum text chunk size may be identified in a manner similar to that for operation 504 shown in FIG. 5.

A text portion is selected for processing at 606. In some embodiments, text portions may be selected sequentially. Sequential or nearly sequential ordering may ensure that semantically contiguous or similar text portions are often included within the same text chunk.

A determination is made at 608 as to whether the text portion fits into the latest text chunk. In some embodiments, text portions may be processed via the method 500 shown in FIG. 5 to ensure that each text portion is smaller than the maximum chunk size. However, a text chunk may already include one or more text portions added to the text chunk in a previous iteration.

In the event that the text portion fits into the last text chunk size, the text portion is inserted into the last text chunk at 610. If instead the text portion is the first to be processed, or the text portion does not fit into the last text chunk size, then the text portion is inserted into a new text chunk at 612. The new chunk may be created with a maximum size in accordance with the maximum text chunk size, which may be the initial maximum text chunk upon the first iteration or the reduced maximum text chunk size upon subsequent iterations.

A determination is made at 614 as to whether to select an additional text portion for processing. In some embodiments, additional text portions may be selected until all text portions have been added to a respective text chunk.

A determination is made at 616 as to whether the number of text chunks has increased relative to the previous maximum text chunk size. If the number of text chunks increases, then a reduced maximum text chunk size is determined at 618, and the text portions are again assigned into chunks in operations 606 through 614.

According to various embodiments, for the first iteration, the number of chunks will not have increased because there was no previous assignment of text portions into text chunks. However, for the second and subsequent iterations, reducing the maximum text chunk size at 618 may cause the number of text chunks needed to hold the text portions to crease because the reduced maximum text chunk size may cause a text portion to no longer fit in a chunk and instead to spill over to the next chunk.

In some embodiments, the first increase of the number of text chunks may cause the termination of the method at operation 620. Alternatively, a different terminating criterion may be met. For instance, an increase in the number of text chunks may be compared with the reduction in text chunk size to produce a ratio, and additional reductions in text chunk size may continue to be imposed so long as the ratio falls below a designated threshold.

In some embodiments, the reduced text chunk size may be determined at 618 in any of various ways. For example, the text chunk size may be reduced by a designated amount (e.g., 10 words, 5 kilobytes, etc.) As another example, the text chunk size may be reduced by a designated percentage (e.g., 1%, 5%, etc.).

When it is determined that the number of text chunks has unacceptably increased, then at 620 the previous maximum text chunk size and assignment of text portions into chunks is returned. In this way, the number of text chunks may be limited while at the same time dividing text portions more equally into text chunks. The number of text chunks may be strictly capped at the input value, or may be allowed to increase to some degree if a sufficiently improved division of text portions into text chunks is achieved.

Figure 7:
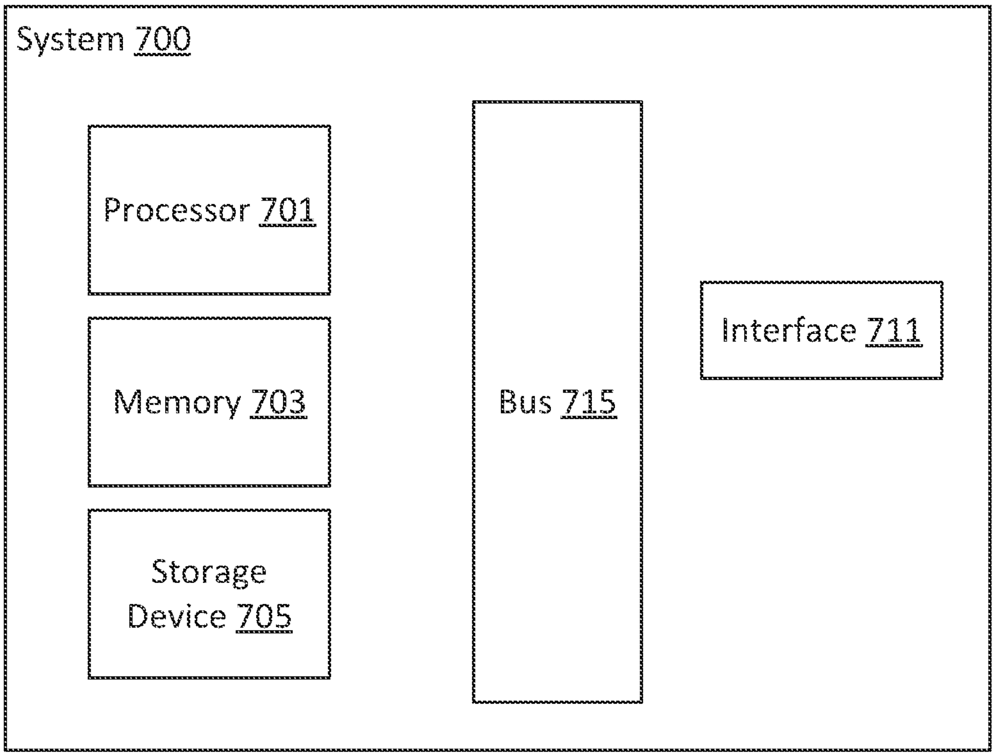
FIG. 7 illustrates one example of a computing device, configured in accordance with one or more embodiments.

FIG. 7 illustrates one example of a computing device 700, configured in accordance with one or more embodiments. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 8:
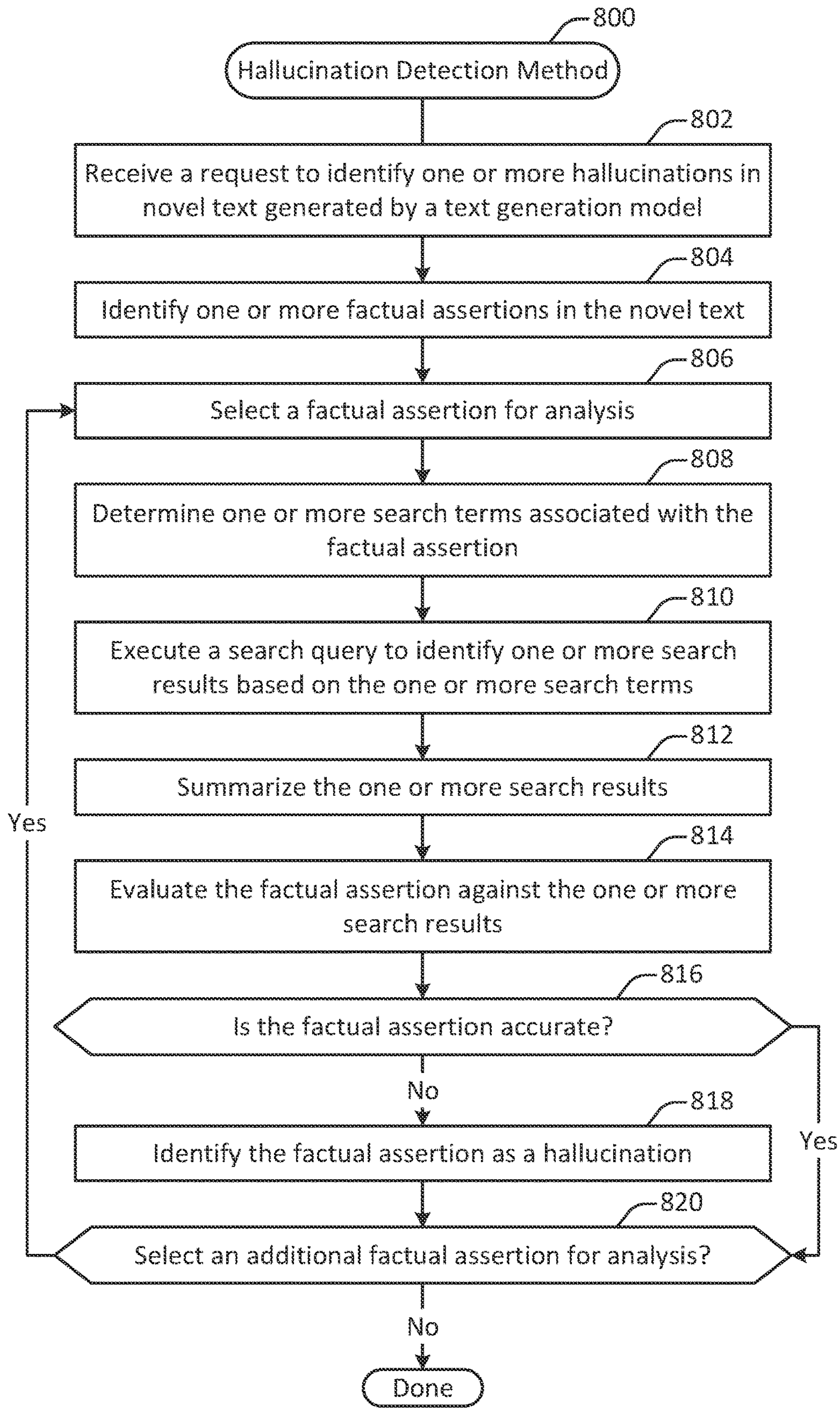
FIG. 8 illustrates a hallucination detection method, performed in accordance with one or more embodiments.

FIG. 8 illustrates a hallucination detection method 800, performed in accordance with one or more embodiments. The method 800 may be performed by the text generation interface system 210 shown in FIG. 2.

In some embodiments, the method 800 may be performed in order to determine whether novel text generated by a text generation modeling system includes one or more hallucinations. Generative text systems sometimes generate text that includes inaccurate claims. For example, in the legal sphere, a request to summarize a set of judicial opinions about a point of law may result in a summary text that includes a citation to a non-existent opinion.

A request is received at 802 to identify one or more hallucinations in novel text generated by a text generation model. In some embodiments, the request may be received as part of one or more methods shown herein. For example, the method 800 may be performed to evaluate a response returned by the text generation modeling system. When employed in this way, the method 800 may be used to prompt the system to revise the response. Alternatively, or additionally, the method 800 may be used to prompt the system to generate a new response, to flag the error to a systems administrator, and/or to inform a response recipient of a potentially inaccurate response.

In some implementations, the request may be received as part of a training and/or testing procedure. For instance, one or more prompts may be tested by the prompt testing utility 226 against one or more tests stored in the test repository 224. A test result may be evaluated using the method 800 to determine whether a prompt constructed from a prompt template being tested resulted in the generation of a hallucination, which may be treated as a test failure.

One or more factual assertions in the novel text are identified at 804. In some embodiments, the one or more factual assertions may be identified by transmitting a prompt to the text generation modeling system. For instance, the novel text may be included in a prompt requesting that the text generation modeling system identify factual claims in the novel text. The resulting completed prompt may be parsed to identify the one or more factual assertions.

A factual assertion is selected for analysis. Factual assertions identified at 804 may be analyzed in sequence, in parallel, or in any suitable order.

One or more search terms associated with the factual assertion are determined at 808. In some embodiments, one or more search terms may be returned by the text generation modeling system at 804. Alternatively, or additionally, one or more search terms may be determined based on a separate request sent to the text generation modeling system for the factual assertion being analyzed.

A search query to identify one or more search results based on the one or more search terms is executed at 810. According to various embodiments, one or more searches may be executed against any suitable database. Such databases may include, but are not limited to: public sources such as the internet, internal document databases, and external document databases.

The one or more search results are summarized at 812. In some embodiments, summarizing the one or more search results may involve, for instance, dividing documents into chunks and transmitting the one or more chunks to the text generation modeling system within summarization prompts.

At 814, the factual assertion is evaluated against the one or more search results. In some embodiments, evaluating the factual assertion may involve transmitting to the text generation modeling system a prompt that includes a request to evaluate the factual assertion, information characterizing the factual assertion, and a summary of the one or more search results determined as discussed at 812.

A determination is made at 816 as to whether the factual assertion is accurate. In some embodiments, the determination may be made by parsing the response returned by the text generation modeling system at 814. For instance, the text generation modeling system may complete the prompt by indicating whether the factual assertion is true, false, or uncertain based on the provided summary of search results.

If it is determined that the factual assertion is inaccurate, then at 818 the factual assertion is identified as a hallucination. In some embodiments, identifying the factual assertion as a hallucination may cause one or more consequences in an encompassing process flow. For example, in a testing phase, the detection of a hallucination may cause the test to fail. As another example, in a production phase, the detection of a hallucination may cause the system to initiate a flow to revise the novel text to remove the hallucination.

Figure 9:
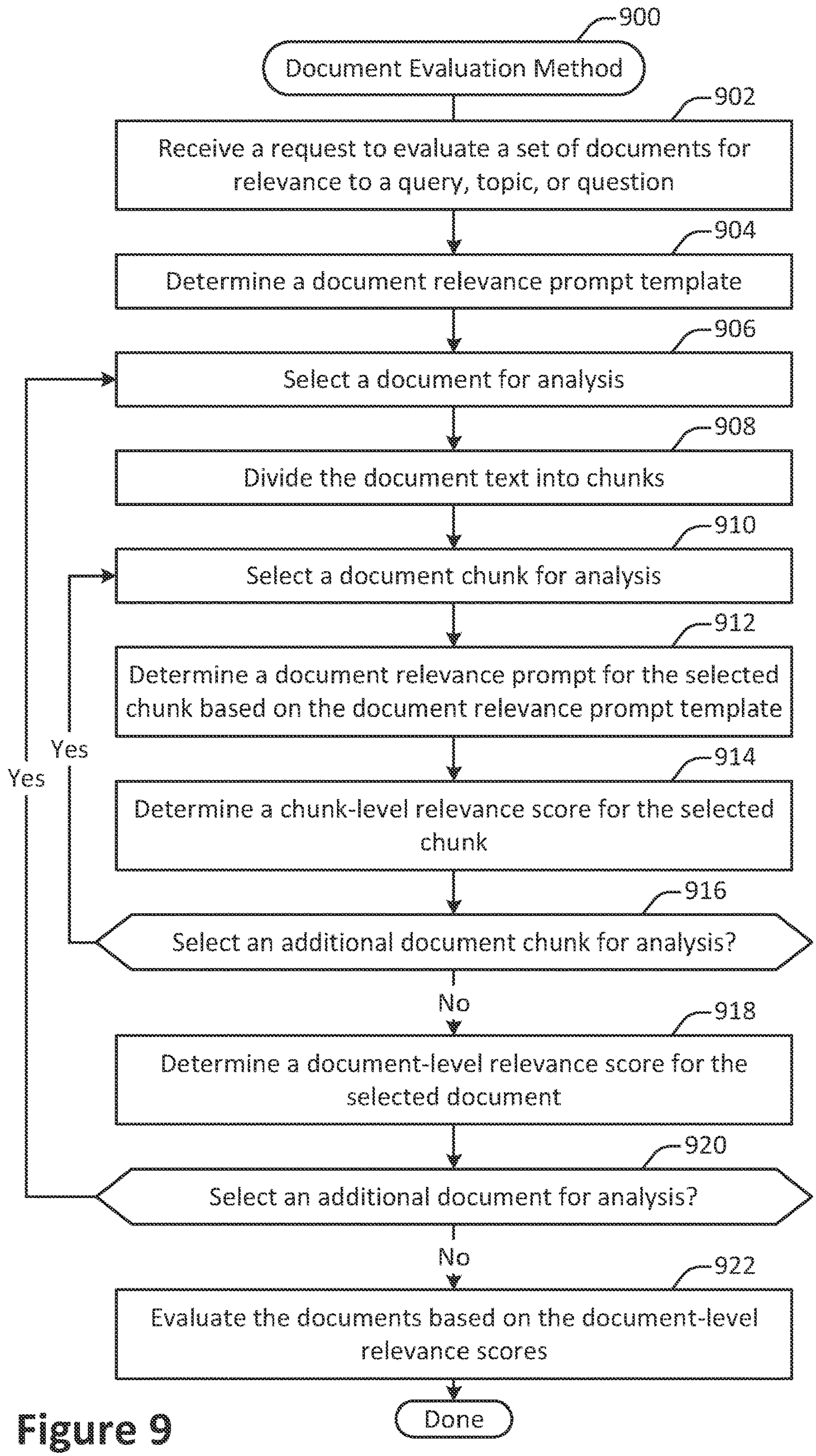
FIG. 9 illustrates a method for evaluating documents, performed in accordance with one or more embodiments.

FIG. 9 illustrates a document evaluation method 900, performed in accordance with one or more embodiments. In some implementations, the method 900 may be performed at a text generation interface system such as the system 200 shown in FIG. 2. For instance, the method 900 may be performed at the text generation interface system 210.

A request to evaluate a set of documents for relevance is received at 902. In some embodiments, the request may be received as part of a chat flow. Alternatively, the request may be received as part of an API call. The query request may be a question written in natural language. Alternatively, or additionally, the query request may include one or more keywords, search terms, and/or Boolean operators. The request may be sent from a client machine and received at the text generation interface system 210.

A document relevance prompt template is determined at 904. In some embodiments, a document relevance prompt template may include one or more natural language instructions. The natural language instructions may include a request to provide an indication as to the relevance of a particular document or documents to one or more search queries, questions, or topics. The natural language instructions may also include one or more criteria for evaluating relevancy. For instance, the natural language instructions may define a scale from one to five or along some other dimension.

In some embodiments, a document relevance prompt template may include a fillable query portion that indicates a region to be filled with all or a portion of one or more search queries, questions, or topics. The fillable query portion may be identified via markup provided in a markup language.

In some embodiments, a document relevance prompt template may include a fillable document portion that indicates a region to be filled with all or a portion of the text of a document. The fillable document portion may be identified via markup provided in a markup language.

In some embodiments, a document relevance prompt template may be optimized to support caching by a large language model. For instance, the document relevance prompt template may start with the natural language instructions, followed by the fillable query portion and the fillable document portion. In this way, the beginning of each of a set of document relevance prompts created based on the document relevance prompt template may be the same, with only the document text varying. Such an approach may allow the large language model to cache at least an initial portion of the document relevance prompt template, which may substantially increase speed and potentially reduce costs.

An example of a document relevance prompt template is as follows. In the following example, the section "$$DOCUMENT PART {{chunk_of[0]}} OF {{chunk_of[1]}}$${%-for line in line_list-%}<LINE:{{loop.index0+100}}>{{line["text"]}} {%-endfor-%}$$/DOCUMENT$$ Question: {{question}}" includes fillable portions that may be filled with the query, question, or topic (i.e., "{{question}}") or document text (e.g., "{{line["text"]}}" to create the relevance prompt from the relevance prompt template.

#Instructions

You are a highly sophisticated legal AI. You are reading a part of a document for a lawyer, and your have two tasks: (1) determine how relevant a part of a document is to the lawyer's question, and then (2) to provide an initial answer based on the part of the document.

Relevance score

You will give a relevance grade based on this rubric:

5: the document substantively answers the question or request being asked, even if the document contains other information as well 4: the document addresses the question or request directly and provides a substantial amount of detail, but it is not exhaustive 3: The document is somehow indicative of an answer to the question, but may not directly answer it 2: the document contains at least some relevant information or at least one fact that may help answer the question or request; this may include a definition, like in a contract, that may be used with a separate part of the document to answer the question. This may include even mundane definitions, like what is the “Plaintiff” or the “Buyer,” which may end up helping the answer.

_LOW: the document contains information that is generally on the same topic but is otherwise does not help answer the question _NONE: the document has nothing to do with the question or request Choose the score with respect to the document and its relevance to the question, even if the document is expressing an opinion or something untrue. For example, if the document says that “the sky is purple”, if the question asks “what color is the sky?” the relevance score would be “5”

The relevance score is only based on the relevance of the text of the part of the document to the question. If you know the answer but the document does not explicitly contain information to answer the question, the appropriate score is _LOW or _NONE, depending on the situation.

If there are no lines to cite to for the answer, the relevance score should be _LOW or _NONE

Answer

Base the answer only on the information contained in the document, and no extraneous information. If a direct answer cannot be derived explicitly from the document, do not answer.

Interpret each question as asking to provide a comprehensive list of every item instead of only a few examples or notable instances. Never summarize or omit information from the document unless the question explicitly asks for that.

Answer based on the full text, not just a portion of it.

Include verbatim quotes from the text (in quotation marks) in the answer. If the quote is altered in any way from the original text, use ellipsis, brackets, or [sic] for minor typos.

If there isn’t a direct answer in the document but helpful information like definitions or background facts (usually, for a relevance score of 2), include that helpful information in the answer.

Be exact in your answer. Check every letter.

It is very important that you not include in the answer itself any reference to relevance scores, lines (as denoted by <LINE:XXX>), or pages, that’s what the rest of the output format is for.

#Output Format

Respond in this format:

Relevance Score: [string or integer; _NONE, _LOW, 2, 3, 4, or 5; the grade you assign using the above rubric]

Answer: [string; Your answer, based only on the text of the document and no extraneous information, even if you know the answer]

Lines: [integers separated by comma; The lines you took your answer from. This will be demarcated in the text as <LINE:XXX> where the line begins. Ignore all other line demarcations. Comma separate lines, if there are multiple, but include no spaces between the line numbers, like: 1, 2, 7. Always include all lines separated by commas instead of a line range even, like: 1, 2, 3, 4, 5, 6, 7. Respond with “null” if no lines apply.]

Reason: [string; The reason behind your Relevance Score. Think step-by-step]

#Examples

Document: $$DOCUMENT PART 3 OF 5$$<LINE:122>Macy’s, Inc. (NYSE:M) today announced plans for three new Macy’s stores, each offering a wide range of merchandise categories.\n\nA three-level, 160,000-square-foot Macy’s in the Mall at Bay Plaza in The Bronx borough of New York City to open in fall 2013 or spring 2014. This new store will be built as part of Prestige Properties’ expansion of Bay Plaza Shopping Center, which serves shoppers along the densely populated I-95 corridor. This will be Macy’s second store in The Bronx (joining Parkchester), and its first new location within New York City since Queens Center was opened in 1995. Bay Plaza will be Macy’s 30th store in the metro New York market. An estimated 225 Macy’s associates will serve customers at Bay Plaza.\n\nA new two-level, 200,000-square-foot Macy’s that will replace the existing Macy’s store in Westfield South Shore in Bay Shore, NY.\n<LINE:123> The current South Shore mall store is scheduled to close in March 2012 for razing, with construction beginning shortly thereafter on a new replacement store to open in fall 2013 to continue to serve the Long Island community. The current South Shore store of 318,000 square feet was opened in 1963 and has a workforce of 180 associates. The company’s current plan is to offer Macy’s South Shore associates the opportunity to transfer to open positions in nearby Macy’s stores during the construction process.\n\nA one-level, 103,000-square-foot Macy’s in the Mall of Victor Valley in Victorville, CA, to open in mid-2013. A former Gottschalk’s store of 72,000-square-feet in that mall will be expanded and renovated into a 103,000-square-foot Macy’s. The Mall of Victor Valley, a Macerich development, serves southern San Bernardino County and surrounding communities in the high desert about 80 miles northeast of Los Angeles. It will be the 11th Macy’s store in the Riverside-San Bernardino market. An estimated 140 Macy’s associates will serve customers in Victorville when the store opens.$$/DOCUMENT$$

Question: How many stores does Macy’s plan to open in New York and California in Fall 2013-Spring 2014, and how big is the South Short store?

Relevance Score: 5

Answer: Macy’s will open three new branches in California and New York in Fall 2013-Spring 2014. The South Shore store is 318,000 square feet.

Lines: 122,123

Reason: The document fully answers the question both about the number of stores and the size of the South Shore store. The score associated with answering the question fully is 5, so it gets a score of 5.

Document: $$DOCUMENT PART 18 of 22$$<LINE:175>I love the way Lebron James plays basketball.\n<LINE:176>Who doesn’t? He’s the GOAT$$/DOCUMENT$$

Question: Who is the best basketball player of all time?

Relevance Score: 5

Answer: According to this part of the document, the best basketball player of all time is Lebron James.

Lines: 176

Reason: The document expresses an opinion directly on point to the question—that Lebron James is the "GOAT" (i.e., greatest of all time). Because the document directly answers the question, it receives a Relevance Score of 5.

Document: $$DOCUMENT PART 44 of 55$$<LINE: 910>The Cadburry Creme Egg commercial series, "goo," was generally thought to be a success for the company. Sales of the seasonal\n<LINE:9110> candies skyrocketed over the course of the 2016 Brazil Olympics, as the candy re-branded to something that was something you could eat during non-holiday times.$$/DOCUMENT$$

Question: Can an advertiser back out of an ad campaign buy when the advertisement is not performing as expected?

Relevance Score: _LOW

Answer: There is nothing in this part of the document that is relevant to the question.

Lines: null

Reason: Although there is an answer to this question, the text of the document does not contain an answer, so the relevance score is _LOW and the answer should describe that there is nothing in this part of the document relevant to the question.

Document: $$DOCUMENT PART 2 OF 3$$<LINE: 109>To: Sally\nFrom: Jane\nSubject: Lunch\n\nMessage: I hope we have the chance to get lunch today. We need to discuss the . . . private matter . . . that we can't talk about over email$$/DOCUMENT$$

Question: What is the best place to go in Disney Land?

Relevance Score: _NONE

Answer: This part of the document has nothing to do with the question

Lines: null

Reason: The document has nothing to do with the question, so it gets a score of _NONE.

Document: $$DOCUMENT PART 3 OF 8$$<LINE: 190>Alan: I think we should absolutely meet up;)/n/nJenny: Yes, but does she know?/n/nAlan: She doesn't need to . . . I can't to see you/n/nJenny: Same <3\n<LINE:191>Alan: In other news, how's work?\n\nJenny: It's fine, I suppose . . . $$/DOCUMENT$$

Question: Does the document contain any evidence of infidelity?

Relevance Score: 3

Answer: This part of the document does not explicitly include evidence of infidelity, but it is implied—Alan and Jenny appear to be planning on a rendezvous, concealing that they are meeting, and flirting.

Lines: 190

Reason: The document gets a score of 3 because it does not include explicit or direct evidence to answer the question, but does imply an answer.

#Real task

Let's begin:

Document: $$DOCUMENT PART {{chunk_of[0]}} OF {{chunk_of[1]}}$${%-for line in line_list-%}
<LINE:{{loop.index0+100}}>{{line["text"]}}
{%-endfor-%}$$/DOCUMENT$$

Question: {{question}}|endofprompt|>

Relevance Score:

A document is selected for analysis at 906. According to various embodiments, documents may be selected in sequence, in parallel, or in any suitable order.

A document chunk is selected for analysis at 908. According to various embodiments, a document chunk may be determined by subdividing the text of a document into portions, for instance as discussed with respect to FIGS. 3, 5, and 6.

A document relevance prompt is determined for the selected chunk at 912 based on the document relevance prompt template. In some implementations, determining the document relevance prompt may involve adding the chunk text to the document relevance prompt template in the fillable document portion. In addition, all or a portion of the query, topic, or question may be added to the document relevance prompt template in a fillable query portion.

A chunk-level relevance score is determined for the selected chunk at 914. In some embodiments, the chunk-level relevance score may be determined at least in part by transmitting the document relevance prompt to a large language model for completion. The large language model may then complete the prompt. The completed prompt may then be parsed to extract the chunk-level relevance score. Additional details regarding the determination of a chunk-level relevance score are discussed with respect to the method 1000 shown in FIG. 10.

A determination is made at 916 as to whether to select an additional document chunk for analysis. According to various embodiments, additional document chunks may continue to be selected until all suitable document chunks have been analyzed. Alternatively, additional document chunks may not need to be selected for analysis if a triggering condition is met. For instance, if a document-level relevance score is determined based on the maximum of the chunk-level relevance scores and if a previously-analyzed chunk-level relevance score has already received the maximum possible relevance value, then further analysis for the document may be unnecessary.

Upon determining not to select an additional document chunk for analysis, a document-level relevance score is determined for the selected document at 918. According to various embodiments, various types of processes may be used to determine a document-level relevance score. For example, a document-level relevance score may be determined as the maximum of the chunk-level relevance scores. As another example, another type of determination, such as averaging or summing, may be used.

In particular embodiments, more than one document-level relevance score may be determined. For instance, a document may be scored along the maximum, sum, and average of the chunk-level relevance scores.

A determination is made at 920 as to whether to select an additional document for analysis. According to various embodiments, documents may continue to be selected until all identified documents have been analyzed. Alternatively, documents may be selected until a triggering condition is met. For example, in a large set of documents, documents may continue to be answered until a determination is made that the query, question, or topic can be addressed via the documents already identified as relevant.

According to various embodiments, the operations shown in FIG. 9 may be performed in an order different than that shown. For example, as discussed herein, one or more operations may be performed in parallel rather than in sequence.

Upon determining not to select an additional document chunk for analysis, the documents are evaluated at 922 based on the document-level relevance scores. Additional details regarding the evaluation of the documents are discussed with respect to the method 1100 shown in FIG. 11.

Figure 10:
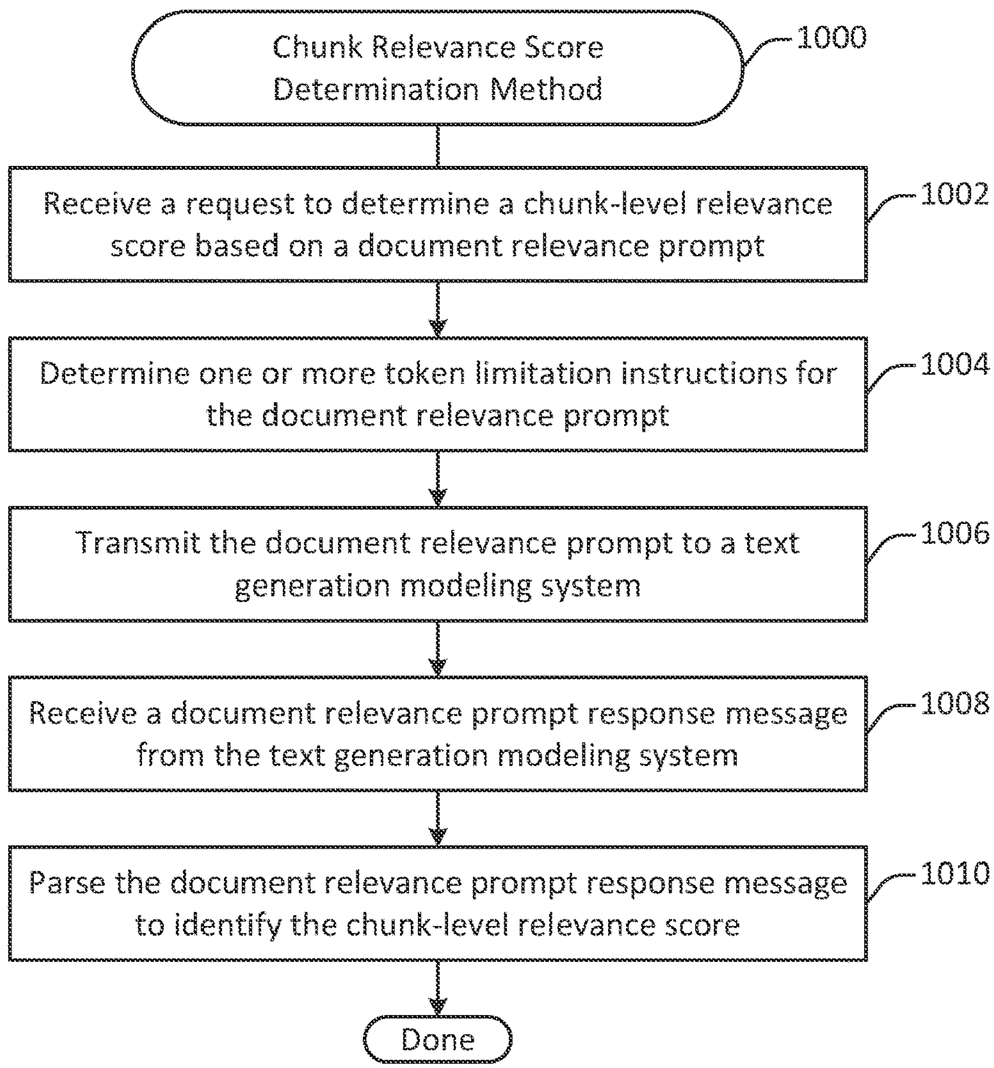
FIG. 10 illustrates a method for determining a chunk relevance score, performed in accordance with one or more embodiments.

FIG. 10 illustrates a method 1000 for determining a chunk relevance score, performed in accordance with one or more embodiments. The method 1000 may be performed at any suitable computing device, such as the text generation interface system 210 shown in FIG. 2.

A request to determine a chunk-level relevance score based on a document relevance prompt is received at 1002. In some embodiments, the request may be generated as discussed with respect to operation 914 shown in FIG. 9.

One or more token limitation instructions for the document relevance prompt are determined at 1004. In some embodiments, the document relevance prompt template may be optimized to reduce or minimize writing by a large language model. A token limitation instruction may work to prevent the large language model from writing more than a designated number of tokens. Such a limitation may significantly increase the speed at which the document relevance prompt can be processed by the large language model.

In some embodiments, the token limitation instruction may be a natural language instruction included in the document relevance prompt. For instance, the token limitation instruction may instruct the large language model to "Limit your response to no more than X words" for some number X.

In some embodiments, the token limitation instruction may be a parameter passed to the large language model in an API call. For instance, the API call may include a parameter defining a maximum number of tokens written by the large language model. Further processing may be halted when the maximum number of tokens has been written.

In particular embodiments, passing the maximum number of tokens to the large language model as part of the API rather than a natural language instructions may, for some models, improve the quality of the resulting analysis since the chunk relevance prompt may contain instructions to provide an explanation for the chunk-level relevance score. Even though the token limitation instruction may prevent the large language model from actually writing the requested explanation, the presence in the prompt of the instruction to generate the explanation may nevertheless result in the large language model generating a more accurate relevance score than it would in the absence of such an instruction because the large language model will generate the relevance score in anticipation of needing to generate the explanation.

According to various embodiments, the token limitation instruction may specify a maximum length. The maximum length may be, for instance, a designated number of words, paragraphs, sentences, tokens, or characters.

In particular embodiments, the token limitation may limit the large language model to generating only a single token. The single token limitation may be passed to the large language model as an API parameter. Alternatively, or additionally, the single token limitation may be passed to the large language model as a natural language instruction.

In some embodiments, the natural language instructions to the large language model may ask that the large language model begins its response with a chunk relevance score. In this way, the chunk relevance score will be written even if subsequent text generation by the large language model is truncated due to a length limitation passed as a parameter to the large language model.

In some embodiments, the chunk relevance score may be constrained via a natural language instruction to be a categorical value. The categorical value may indicate a relevance value for all of the document text included in the fillable document portion of the document relevance prompt. For example, the categorical value may be a number between one and five.

In particular embodiments, information about more than one query topic may be provided in a compressed format. For example, the natural language instructions may include instructions to rate the included text for relevance to three different questions, queries, or topics, and produce three different relevance values each between one and five. The natural language instructions may also include an instruction to concatenate the three different relevance values into a single number (e.g., produce 135 from individual relevance scores 1, 3, and 5).

Figure 11:
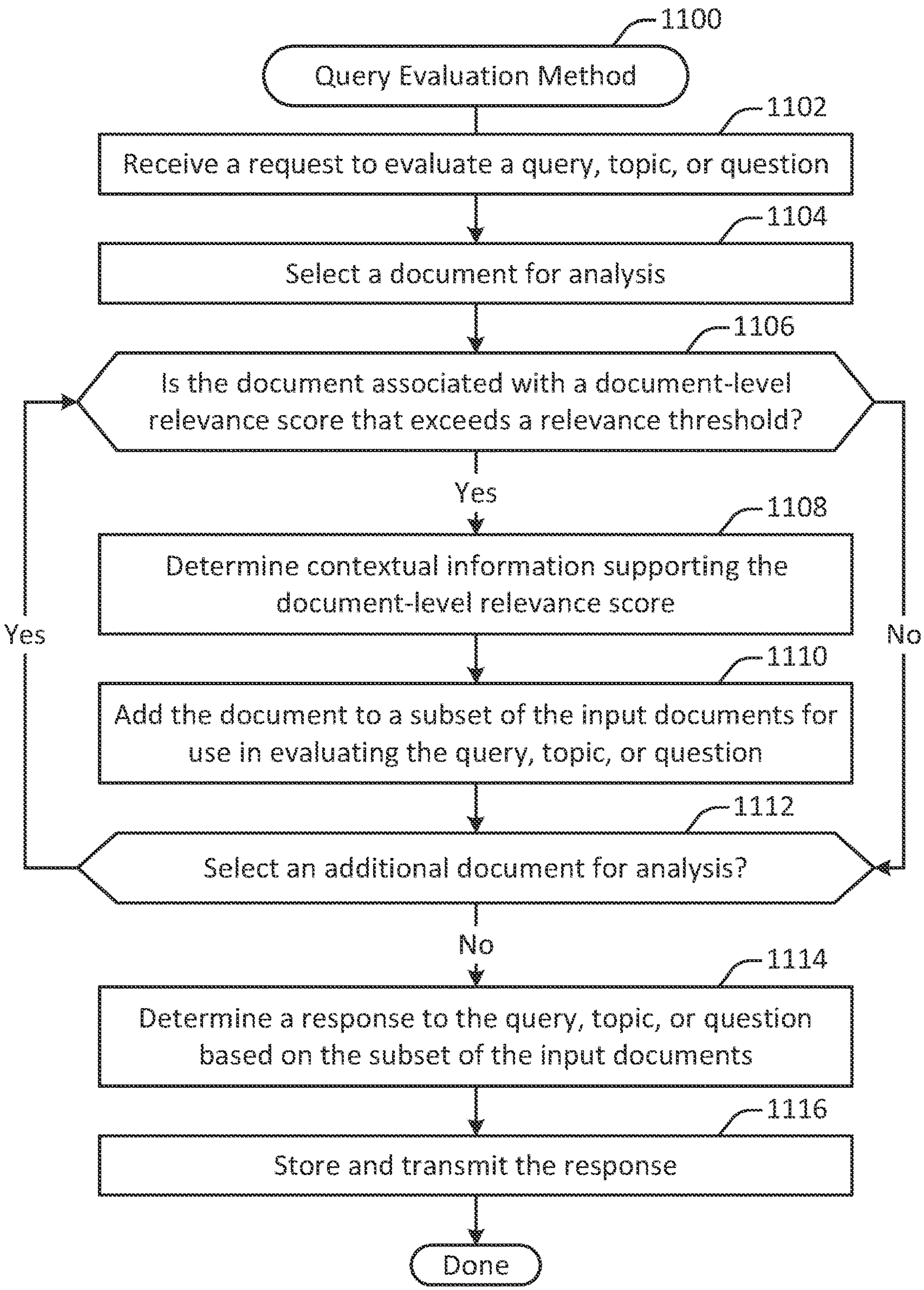
FIG. 11 illustrates a method for evaluating a query, performed in accordance with one or more embodiments.

FIG. 11 illustrates a method 1100 for evaluating a query, performed in accordance with one or more embodiments. In some implementations, the method 1100 may be performed at a text generation interface system such as the system 200 shown in FIG. 2. For instance, the method 1100 may be performed at the text generation interface system 210.

A request to evaluate a query, topic, or question is received at 1102. In some embodiments, the request may be generated as discussed with respect to the operation 922 shown in FIG. 9.

A document is selected for analysis at 1104. According to various embodiments, documents may be selected in any suitable order, in sequence or in parallel. For example, documents may be selected in order of relevance scores from most-relevant to least-relevant. As another example, a batch of documents may be analyzed in parallel.

A determination is made at 1106 as to whether the document is associated with a document-level relevance score that exceeds a relevance threshold. In some embodiments, the relevance threshold score may be fixed (e.g., 3 out of a maximum possible score of 5). Alternatively, the relevance threshold may depend on one or more characteristics such as the number of documents being analyzed, the document-level relevance scores for those documents, the complexity of the query, question, or topic, or other such information. As still another possibility, the relevance threshold may reflect a designated number of documents. For instance, the top N or top N percent of documents by document-level relevance scores may be selected.

Upon determining that the document is associated with a document-level relevance score that exceeds a relevance threshold, contextual information supporting the document-level relevance score is optionally obtained at 1108. In some embodiments, determining contextual information may involve transmitting to the large language model a follow-up relevance explanation prompt requesting that the large language model provide a natural language explanation as to why the selected document was deemed relevant to the query, topic, or question. The follow-up relevance explanation prompt may then be parsed to extract the explanation, which may be included with the document when determining a response to the query, topic, or question.

In some embodiments, the follow-up relevance explanation prompt may be identical or substantially similar to the document relevance prompt, with the exception that the length limitation may be removed or relaxed. Thus, determining contextual information supporting the document-level relevance score at 1208 may involve performing substantially the same operations discussed with respect to FIG. 9 and FIG. 10.

At 1110, the document is added to a subset of the input documents for use in evaluating the query, topic, or question. In some embodiments, adding the document to the subset of the input documents may involve storing an identifier for the selected document such that the document can be retrieved during subsequent analysis.

A determination is made at 1112 as to whether to select an additional document for analysis. According to various embodiments, additional documents may continue to be selected until all available documents have been analyzed or until some other triggering condition is met. For instance, additional documents may continue to be selected until a designated number of documents have been selected or until sufficient information has been collected to as to answer the query.

Upon determining not to select an additional document for analysis, a response to the query, topic, or question is determined at 1114 based on the subset of the input documents. According to various embodiments, additional details regarding procedures that may be used to determine a response to the query, topic, or question are discussed with respect to FIG. 12 and FIG. 13.

The response is stored and transmitted at 1116. According to various embodiments, the response may be stored on a storage device and/or transmitted to a client machine.

Figure 12:
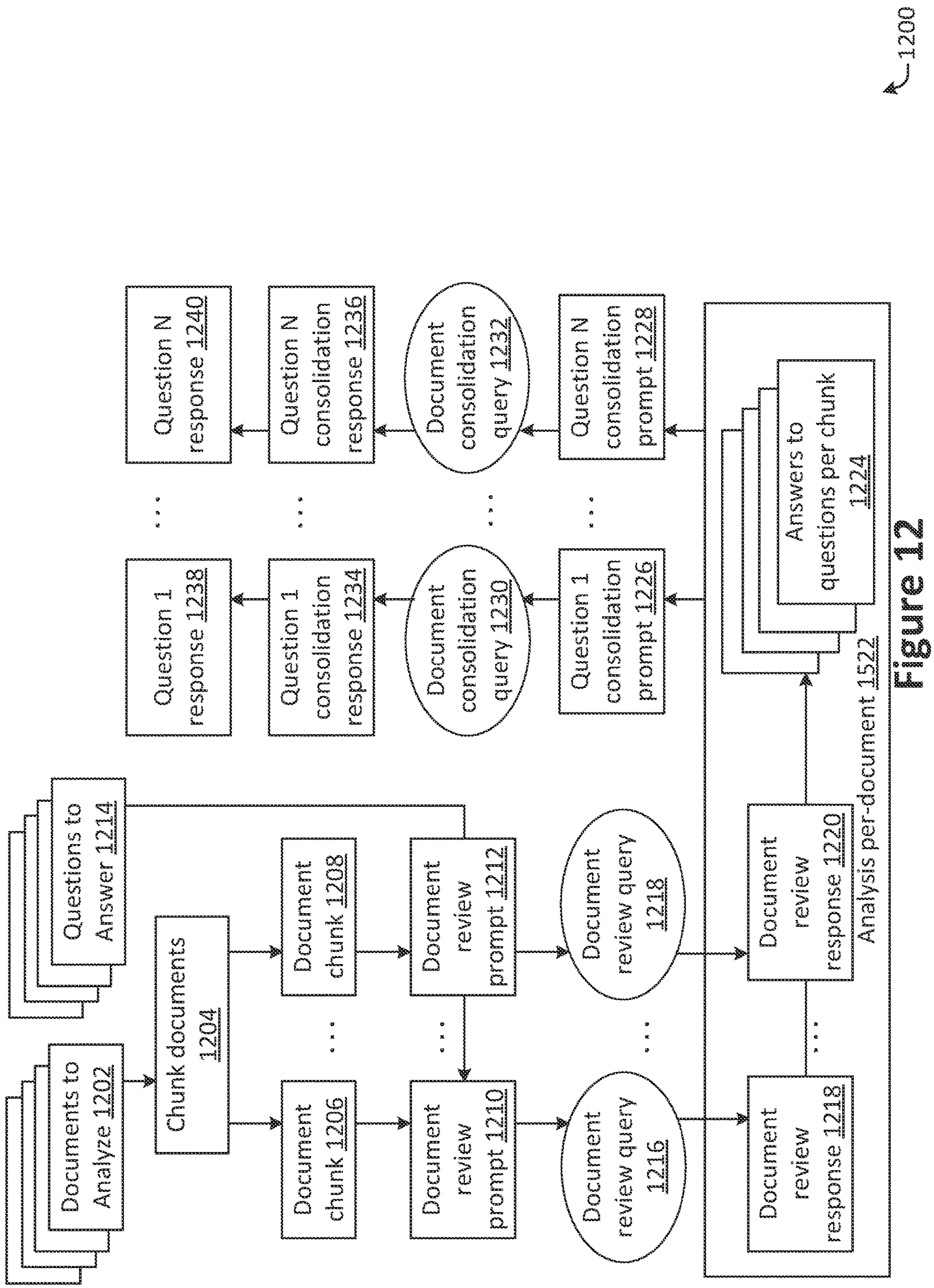
FIG. 12 illustrates a document review process, performed in accordance with one or more embodiments.

FIG. 12 illustrates a document review process 1200, performed in accordance with one or more embodiments. The method 1200 may be performed by the text generation interface system 210 shown in FIG. 2.

A document review request is received at 1202. One or more questions to answer are received at 1214, either separately or along with the documents to analyze. According to various embodiments, any of a variety of questions may be posed. For example, one question may be: "What is the penalty of cancelation for the contract?"

In some embodiments, the request and/or questions may be received as part of a chat flow. Alternatively, the request and/or questions may be received as part of an API call. The document review request may identify one or more documents to analyze. The request may be sent from a client machine and received at the text generation interface system 210.

The one or more documents are chunked at 1204 to produce one or more document chunks at 1206 through 1208. Additional details regarding document chunking are discussed throughout the application, for instance with respect to the method 600 shown in FIG. 6.

The document chunks and the questions to answer are used to generate document review prompts at 1210 through 1212. A document review prompt may be created by combining a document chunk with one or more questions and a document review prompt template. The document review prompt template may have one or more fillable portions that may be filled with text determined based on the document chunk and questions. The document review prompt may include one or more instructions to a large language model. For example, the document review prompt may instruct the large language model to answer the one or more questions based on the text in the document chunk. As another example, the document review prompt may instruct the large language model to format its response in a particular way. For instance, the prompt may include formatting instructions such as one or more escape characters to employ, JSON formatting to aggregate multiple citations into a single response message, or other such instructions.

In some embodiments, the document review prompt may instruct the text generation model to perform different tasks. For example, a first task may instruct the model to extract portions of the text that are relevant to the identified questions. Extracted passages may then be rated based on their relevancy. The second task may instruct the model to formulate a response to the questions using the text portions. The instructions may include additional details related to the preparation of the answers to the questions. An example of a document review prompt is as follows:

You are a highly sophisticated legal AI. A lawyer has submitted questions that need answers.

Below is a portion of a longer document that may be responsive to the questions:

$$DOCUMENT$$
    {%-for page in page_list-%}
        $$PAGE {{page["page"]}}$$
        {{page["text"]}}
        $$/PAGE$$
    {%-endfor-%}
$$/DOCUMENT$$

We would like you to perform two tasks that will help the lawyer answer the questions. Each task should be performed completely independently, so that the lawyer can compare the results.

Extractive Task

The purpose of this task is not to answer the questions, but to find any passages in the document that will help the lawyer answer them. For each question, perform the following steps:

1. Extract verbatim as many passages from the document (sentences, sentence fragments, or phrases) as possible that could be useful in answering the question. There is no limit on the number of passages you can extract, so more is better. Don't worry if the passages are repetitive; we need every single one you can find.

If the question asks for a list of things or the number of times something occurred, include a passage for every instance that appears in the document 2. If you extracted any passages, assign each one a score from 1 to 5, representing how the passage relates to the question:

5 (complete answer)
4 (one piece of a multipart answer)
3 (relevant definition or fact)
2 (useful context)
1 (marginally related)

Abstractive task

The purpose of this task is to compose an answer to each question. Follow these instructions:

Base the answer only on the information contained in the document, and no extraneous information. If a direct answer cannot be derived explicitly from the document, do not answer.

Answer completely, fully, and precisely.

Interpret each question as asking to provide a comprehensive list of every item instead of only a few examples or notable instances. Never summarize or omit information from the document unless the question explicitly asks for that.

Answer based on the full text, not just a portion of it.

For each and every question, include verbatim quotes from the text (in quotation marks) in the answer. If the quote is altered in any way from the original text, use ellipsis, brackets, or [sic] for minor typos.

Be exact in your answer. Check every letter.

There is no limit on the length of your answer, and more is better

Compose a full answer to each question; even if the answer is also contained in a response to another question, still include it in each answer
Here are the questions:
$$QUESTIONS$$
{{question_str}}
$$/QUESTIONS$$
Return your responses as a well-formed JSON array of objects, with each object having keys of:
'id' (string) The three-digit ID associated with the Question
'passages' (array) a JSON array of the verbatim passages you extracted, or else an empty array. Format each item as a JSON object with keys of:
'passage' (string)
'score' (int) the relevancy score you assigned the passage
'page' (int) the number assigned to the page in which the snippet appears
'answer' (string) the answer you drafted, or else "N/A"
Escape any internal quotation marks or newlines using \" or \n
[{"id": <id>, "passages": [{"passage": <passage>, "score": <score>, "page": }, . . . ]|[ ], "answer": <text>|"N/A"}, . . . ]
Only valid JSON; check to make sure it parses, and that quotes within quotes are escaped or turned to single quotes, and don't forget the ',' delimiters.
<|endofprompt|>
Here is the JSON array and nothing else:

The document review prompts are sent to the text generation modeling system 270 via one or more API calls at 1216 through 1218, where they are individually analyzed and completed by the text generation model 276. At 1218 through 1220, the text generation modeling system 270 sends one or more document review response messages to the text generation interface system 210. According to various embodiments, each document review response message may include a completed document review prompt corresponding to a prompt query sent as discussed at 1216 through 1218. The analysis at 1222 is shown on a per-document level for clarity, as each document may be divided into one or more chunks, each of which may correspond to a separate document review query.

At 1224, the document review responses are parsed to identify an answer to each of the questions for each of the chunks in the document. Because each document may include more than one chunk, different chunks in the same document may have different answers to the same question. For instance, a question such as "What is the capital city of the United States" may be answered in one part of a document but not in another part of the same document, leading to chunk-level variation in document answers.

At 1226 through 1228, a question consolidation prompt is created for each of the questions received at 1214. Each question consolidation prompt may include the chunk-level answers to the questions determined as discussed with respect to operation 1224. A single question consolidation prompt may include answers to the same question from different documents, and indeed may include multiple answers to the same question from different chunks in the same document. A question consolidation prompt may be created by combining a question and one or more of the answers to the question with a question consolidation prompt template that includes one or more instructions for consolidating the answers.

In particular embodiments, a question consolidation prompt may exclude document chunks that are deemed insufficiently relevant to answering the question. For example, each question consolidation prompt may include the document portions whose relevancy score exceeds a designated threshold. As another example, a question consolidation prompt may include the most relevant document portions by rank ordering.

An example of a question consolidation prompt is as follows:

A lawyer has submitted the following question:
$$QUESTION$$
{{question}}
$$/QUESTION$$
We have already reviewed source documents and extracted references that may help answer the question. We have also grouped the references and provided a summary of each group as a "response":
$$RESPONSES$$
{% for response in model_responses %}
{{loop.index}}. {{response}}
{% endfor %}
$$/RESPONSES$$
We want to know what overall answer the responses provide to the question.
We think that some references are more relevant than others, so we have assigned them relevancy scores of 1 to 5, with 1 being least relevant and 5 being most relevant. However, it's possible that some references may have been taken out of context. If a reference is missing context needed to determine whether it truly supports the response, subtract 1 point from its relevancy score.
Then, rank each response from most-reliable to least-reliable, based on the adjusted relevancy scores and how well the references support the response.
Draft a concise answer to the question based only on the references and responses provided, prioritizing responses that you determined to be more reliable.
If the most-reliable response completely answers the question, use its verbatim text as your answer and don't mention any other responses.
Answer only the question asked and do not include any extraneous information.
Don't let the lawyer know that we are using responses, references, or relevancy scores; instead, phrase the answer as if it is based on your own personal knowledge.
Assume that all the information provided is true, even if you know otherwise
If the none of the responses seem relevant to the question, just say "The documents provided do not fully answer this question; however, the following results may be relevant." and nothing else.
<|endofprompt|>
Here's the answer and nothing else:

The question consolidation prompts are sent to the text generation modeling system 270 via one or more API calls at 1230 through 1232, where they are individually analyzed and completed by the text generation model 276. At 1234 through 1236, the text generation modeling system 270 sends one or more question consolidation prompt response messages to the text generation interface system 210. According to various embodiments, each question consolidation prompts response message may include a completed question consolidation prompt corresponding to a prompt query sent as discussed at 1230 through 1232.

The responses may then be parsed and provided to the client machine.

According to various embodiments, a parsed response may include any or all of the information discussed with respect to FIG. 12. For example, a parsed response may include a question, an aggregate answer to the question as parsed from the corresponding question consolidation response message, and/or one or more chunk-level answers that indicate where in particular documents the most relevant information for answering the question was found. As another example, the parsed response may include the most relevant chunk-level answers for each document for the question.

In some embodiments, providing a response to the document analysis request may involve transmitting a message such as an email or chat response. Alternatively, or additionally, an answer may be stored in a file or a database system.

Figure 13:
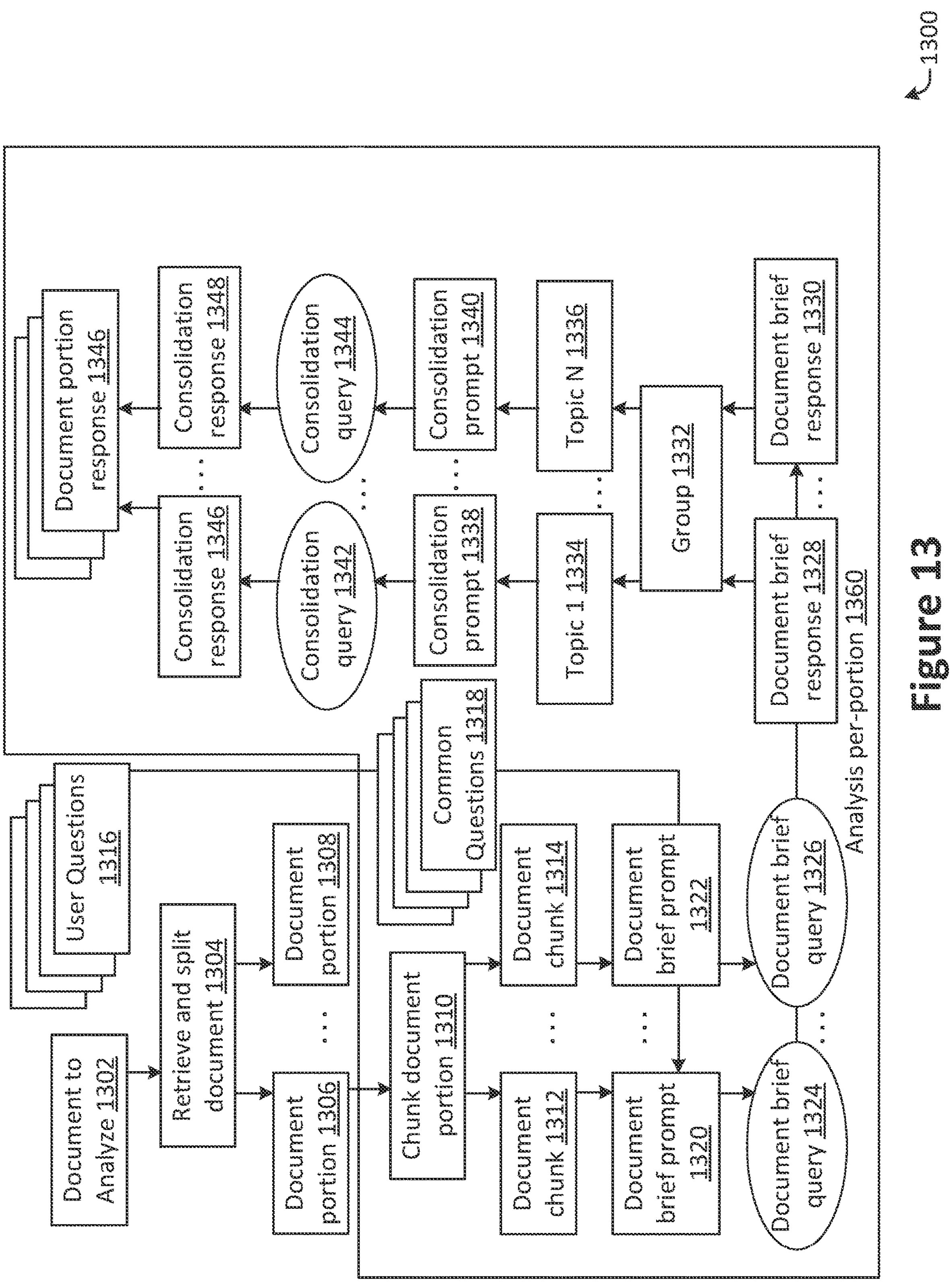
FIG. 13 illustrates a document briefing process, performed in accordance with one or more embodiments.

FIG. 13 illustrates a document briefing process 1300, performed in accordance with one or more embodiments. The method 1300 may be performed by the text generation interface system 210 shown in FIG. 2.

A document brief request is received at 1302. One or more questions to answer are received at 1316, either separately or along with the document to analyze. According to various embodiments, any of a variety of questions may be posed. For example, one question may be: "Was the defendant found to have committed malpractice?"

In some embodiments, the request and/or questions may be received as part of a chat flow. Alternatively, the request and/or questions may be received as part of an API call. The document review request may be identify one or more documents to analyze. The request may be sent from a client machine and received at the text generation interface system 210.

The document is retrieved and split at 1304. In some embodiments, the document may be provided as part of the request to analyze. Alternatively, the document may be retrieved from a database system, for instance via a query. Splitting the document may involve dividing it into logical portions. For example, in the legal context, a decision by a court may be split into a majority opinion, a dissenting opinion, and a concurring opinion. The document may be split into portions by, for instance, a document parser that is specific to the document context.

In some implementations, the document portions 1306 through 1308 may be separately analyzed on a per-portion basis at 1360. Because these portions are logically separate, the same question may have different answers in these different portions.

The document portion is divided into chunks at 1310. The document chunks 1312 through 1314 are used to prepare corresponding document brief prompts at 1320 through 1322. A document brief prompt may be created based on a document chunk, one or more user questions 1316, and/or one or more common questions 1318.

According to various embodiments, a common question may include a general or domain-specific query used to generate a summary of the document. For example, a common question may ask the text generation model to generate an itemized summary of facts in the document. As another example, in the legal context, a common question may ask the text generation model to identify all legal holdings. As yet another example, a common question may ask the text generation model to identify citations in the document.

In some implementations, the document review prompt may instruct the text generation model to perform different tasks. For example, the prompt may instruct the model to formulate a response to the questions using the text portions. The instructions may include additional details related to the preparation of the answers to the questions. a document brief may include metadata associated with the document. For instance, in the legal context, a document brief may indicate information such as an opinion name and/or opinion type associated with a legal opinion issued by a court. An example of a document brief prompt in the legal context is as follows:

Below is text from a legal opinion, {{opinion_name}}. The text is most likely from the {{opinion_type}}, but it might not be:
$$LEGAL_OPINION_SECTION$$
{{legal_opinion_section}}
$$/LEGAL_OPINION_SECTION$$
{%-if questions_with_ids-%}
A user has also submitted the following question(s):
$$QUESTION(S)$$
{%-for question_with_id in questions_with_ids-%}
{{question_with_id[0]}}: {{question_with_id[1]}}
{%-endfor-%}
$$/QUESTION(S)$$
The legal opinion may or may not be relevant to the questions.
{%-endif-%}
Using the opinion text, construct a JSON Lines list of objects, each having keys of 'type' and 'description', according to the following rules:
for each key fact of the case ({{opinion_name}}, a type of 'fact'
key facts include the names of the parties involved, their posture in the case (i.e. plaintiff, defendant, etc.), and the dispute at issue
summarize the facts but include any details that are relevant to the case
only use facts from {{opinion_name}}, and not facts from any other cases cited in the opinion
for each key piece of procedural history of the case, a type of 'procedural_history'
the procedural history generally begins when the litigation starts (i.e., when the plaintiff files a complaint)
for the outcome of {{opinion_name}}, a type of 'outcome'.
also include a 'motion' key specifying any motion the court is ruling on. If there is no motion, its value should be an empty string " "
for each rule of black-letter law upon which the court relied, a type of 'rule'
for each legal question the court addresses, a type of 'issue'
just state the issue, and not the court's resolution of the issue
for each holding in the case (including the reasoning guiding the court's decision), a type of 'holding'
for each case the court cites, a type of 'outbound_cite'. This object should also include:
the case's full legal citation as a 'citation' key, and
a 'treatment' key describing how {{opinion_name}} treats the cited authority
treatment may be neutral, overruled, distinguished, overruled in part, questioned, reversed, vacated, affirmed, or any other short phrase that accurately characterizes the treatment.

the 'description' key should briefly describe the treatment, including if {{opinion_name}} mentions that the cited case is treated by a third case, or
the citation is from a dissent or concurrence
{%-if questions_with_ids-%}
for each question above, a type of 'answer'
this object should also include a 'question_id' key indicating which question (Q1, Q2, etc.) it is answering
the description key should be the succinct answer to the question, but only if the opinion text answers the question. otherwise, the description should be an empty string " "
{%-endif-%}
unless otherwise provided, each description key should be a succinct (no more than a few sentences) but complete summary of the item
do not use any 'type' keys other than those above
Your answer must be thorough and complete, capturing every item of the types described above that appears in the text.
Return a JSON Lines (newline-delimited JSON) list of the objects.
<|endofprompt|>
Here's the JSONLines list of items:

The document brief prompts are sent to the text generation modeling system 270 via one or more API calls at 1324 through 1326, where they are individually analyzed and completed by the text generation model 276. At 1328 through 1330, the text generation modeling system 270 sends one or more question consolidation prompt response messages to the text generation interface system 210. According to various embodiments, each document brief response message may include a completed document brief prompt corresponding to a prompt query sent as discussed at 1320 through 1326.

The document brief responses are parsed and grouped into individual topics at 1332 to create the topic portions 1334 through 1336. In some embodiments, a topic may correspond to answers provided in response to one or more of the user questions 1316 and/or the common questions 1318. For example, a topic may include answers from different document chunks generated in response to a user question 1316 for those chunks. In this way, a user question that has answers spread over multiple chunks of the document may be answered by combining the various answers into a cohesive whole.

In some embodiments, a topic may correspond to answers provided in response to one or more of the common questions 1318. For instance, in the example of the question asking the text generation model to generate a list of facts, a topic may include facts generated by the text generation model in response to that query for different chunks of the document. In this way, facts determined at various portions of the document may be collected and aggregated.

The parsed and grouped topics are then used to create topic consolidation prompts at 1338 through 1340. Each topic consolidation prompt may include the chunk-level information associated with the topic. A topic consolidation prompt may be created by combining a topic and one or more relevant generated text portions with a topic prompt template that includes one or more instructions for consolidating the text portions. A topic consolidation prompt may include one or more instructions for deduplicating, summarizing, and/or otherwise combining one or more text portions associated with the topic.

In particular embodiments, a topic consolidation prompt may exclude document chunks that are deemed insufficiently relevant to the topic. For example, each topic consolidation prompt may include the document portions whose relevancy score exceeds a designated threshold. As another example, a topic consolidation prompt may include the most relevant document portions by rank ordering. An example of a topic consolidation prompt in the legal context is as follows:

Below is a list of one or more JSON Lines (newline-delimited JSON) objects describing some aspect(s) of a judicial opinion.
{%-for jsonl_item in jsonl_items-%}
{{jsonl_item}}
{%-endfor-%}
Remove any duplicate item(s) from the list and return the remaining item(s) as a JSON Lines list of objects.
<|endofprompt|>
Here is the JSON Lines list and nothing else:

The topic consolidation prompts are sent to the text generation modeling system 270 via one or more API calls at 1342 through 1344, where they are individually analyzed and completed by the text generation model 276. At 1346 through 1348, the text generation modeling system 270 sends one or more topic consolidation prompt response messages to the text generation interface system 210. According to various embodiments, each topic consolidation response message may include a topic consolidation brief prompt corresponding to a prompt query sent as discussed at 1334 through 1344.

The consolidation responses are parsed and provided as a response to the document analysis request at 1346. According to various embodiments, because different document portions may include different answers to the same questions, the responses may be separated by document portion and grouped by topic. In this way, the response recipient may be provided with an accurate answer to potentially many different questions for different portions of a document.

Figure 14:
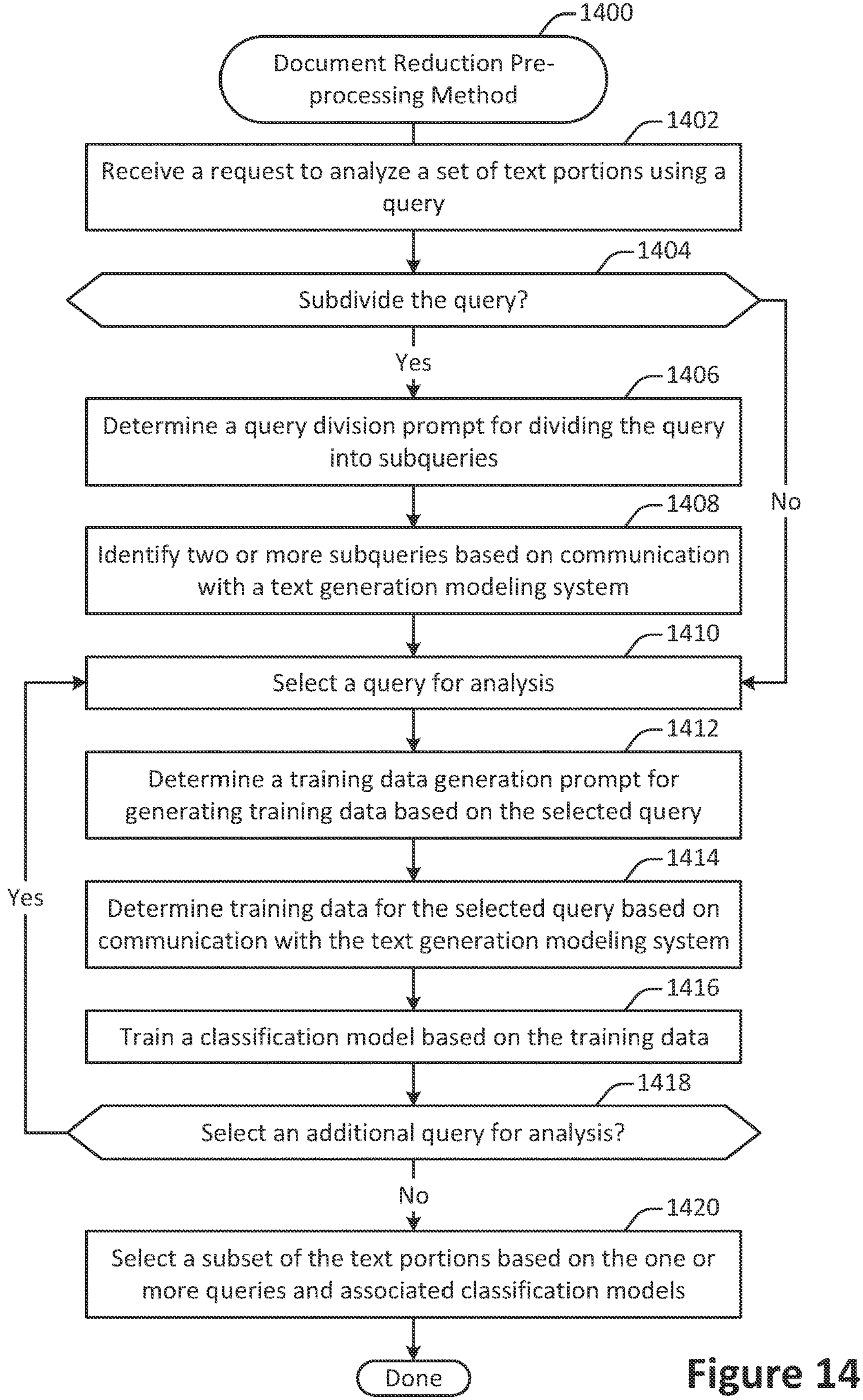
FIG. 14 illustrates a document reduction pre-processing method, performed in accordance with one or more embodiments.

FIG. 14 illustrates a document reduction pre-processing method 1400, performed in accordance with one or more embodiments. The method 1400 may be performed at a text generation system such as the system 200 shown in FIG. 2. For instance, the method 1400 may be performed at the text generation interface system 210.

A request to analyze a set of text portions using a query is received at 1402. In some embodiments, the request may be received via a chat interface. For instance, the text generation interface system may receive text-based messages from a client machine and then provide to the client machine text-based responses generated by a machine learning model. Alternatively, the request may be received in some other way, such as via an API request. The request may be generated automatically or based on user input.

According to various embodiments, a text portion may correspond to a document, a set of documents, a portion of a document, or text outside the context of a document. Text portions may be identified in any of various ways. For example, the request received at 1402 may include one or more identifiers that uniquely identify individual text portions and/or groups of text portions stored in a document repository or other location accessible to the text generation interface system. As another example, the request received at 1402 may include a query for searching for text portions within one or more document repositories or other sources of text, and the text portions identified at 1402 may include results determined by executing such a search.

In some implementations, the query included in the request received at 1402 may include a natural language question, instruction, filter, or other such actionable text implemented in natural language. For example, the query may ask the text generation interface system to answer a set of questions based on information stored in the text portions. As another example, the query may ask the text generation interface system to generate a set of questions for resolving uncertainty related to a topic based on the text portions. As yet another example, the query may ask the text generation interface system to generate an argument or a response to an argument based on the text portions. In this case, the query may include reference information such as an argument to which the text generation interface system is being asked to respond. Thus, the query may include additional information beyond an instruction, a question, or the like, such as contextual information needed to execute the request.

A determination is made at 1404 as to whether to subdivide the query. In some embodiments, the determination may be made based on one or more indicators that the query is complex. For example, a determination may be made to subdivide a query based on its length and/or complexity. As another example, a determination may be made to subdivide the query based on the presence, absence, or number of characteristics such as question marks, sentences, conjunctives, and other such features. The determination may be made based at least in part on a machine learning model applied to the query to classify it in terms of complexity.

If it is determined to subdivide the query, then at 1406 a query division prompt is determined for dividing the query into subqueries. In some embodiments, the prompt may be determined by combining a prompt template with the text of the query. The prompt template may include an instruction to divide the query into a set of subqueries. The prompt template may also include a fillable portion into which the query text may be inserted. The prompt template may also include one or more additional instructions, such as an instruction to format the text generated by the text generation model as structured text. For instance, the structured text may be implemented as a JSON list. An example of a query division prompt template is as follows:

You are part of a retrieval system that attempts to understand user queries, split the following query into simpler queries that can be run individually:

{{query text}}

<|endofprompt|>

At 1408, two or more subqueries are identified based on communication with a text generation modeling system. In some embodiments, the two or more subqueries may be identified by sending the query division prompt to the remote text generation modeling system via an API request. A text generation model implemented at the remote text generation modeling system may then complete the query division prompt, after which it may be sent back to the text generation interface system. The text generation interface system may then extract the subqueries from the completed query division prompt, for instance by parsing JSON included in the completed request.

A query is selected for analysis at 1410. According to various embodiments, queries may be analyzed in sequence, in parallel, or in any suitable order.

A training data generation prompt for generating training data based on the selected query is determined at 1412. In some embodiments, the training data generation prompt may include an instruction for instructing a text generation modeling system to generate text that matches the query. The training data generation prompt may include a fillable portion for including the text of the query.

Training data for the selected query is determined at 1414 based on communication with the text generation modeling system. In some embodiments, the training data may be identified by sending the training data generation prompt to the remote text generation modeling system via an API request. A text generation model implemented at the remote text generation modeling system may then complete the training data generation prompt, after which it may be sent back to the text generation interface system. The text generation interface system may then extract the training data from the completed query division prompt, for instance by parsing JSON included in the completed request. An example of a prompt template for generating training data in the context of legal contracts is as follows:

The task is to generate queries and <N> variations thereof that would retrieve a specific contract clause in a retrieval system comprised of a large collection of contracts.

Given the following clause for clause type <clause_type>:

<clause> queries:

<|endofprompt|>

In some embodiments, the training data may include one or more training data text portions. Each training data text portion may include text constructed by the text generation modeling system based on the text of the query. For example, a training data text portion may substitute one or more of the words in the query for synonyms. As another example, a training data text portion may restate a query using a different sentence structure.

A trained classification model is determined at 1416 based on the training data. According to various embodiments, any of a variety of classification models may be used. For instance, the classification model may include a text embedding model that positions text in a vector space.

A determination is made at 1418 as to whether to select an additional query for analysis. In some implementations, additional queries may continue to be selected until all available queries are processed.

If it is determined not to select an additional query for analysis, then a subset of the text portions is selected based on the one or more queries and the associated classification models. Additional details regarding the selection of text portions for analysis are discussed with respect to the method 1500 shown in FIG. 15.

Figure 15:
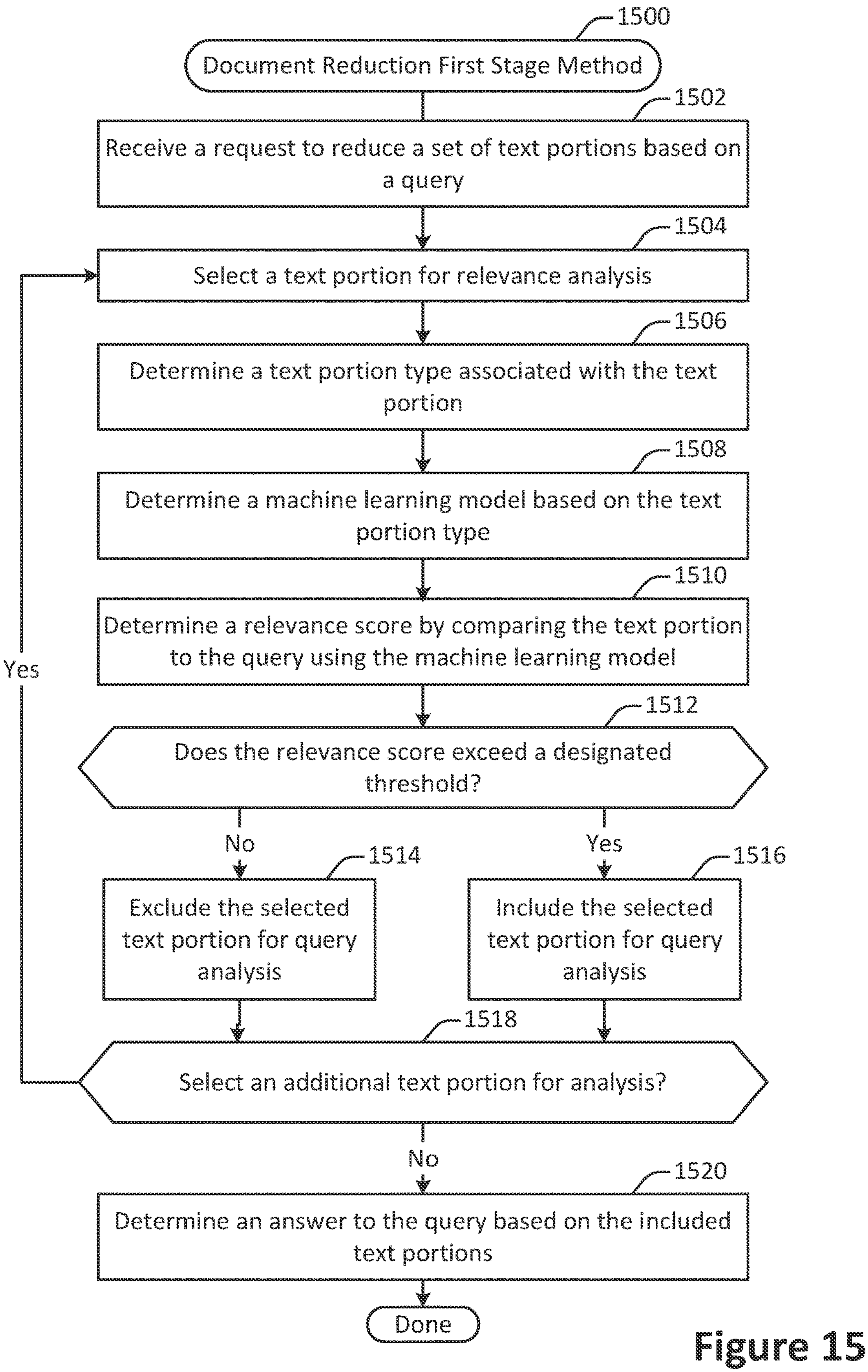
FIG. 15 illustrates a document reduction first stage method, performed in accordance with one or more embodiments.

FIG. 15 illustrates a document reduction first stage method 1500, performed in accordance with one or more embodiments. The method 1500 may be performed at a text generation system such as the system 200 shown in FIG. 2. For instance, the method 1500 may be performed at the text generation interface system 210.

A request is received at 1502 to reduce a set of text portions based on a query. In some embodiments, the request may be generated as discussed with respect to operation 106. The request may identify a query to answer and a set of text portions that may be used to answer the query. Optionally, the request may be generated after performing one or more of the preprocessing operations discussed with respect to the method 1400 shown in FIG. 14.

A text portion is selected for relevance analysis at 1504. According to various embodiments, text portions may be analyzed in parallel or in sequence, and in any suitable order.

A text portion type associated with the text portion is determined at 1506. A machine learning model is determined at 1508 based on the text portion type. In some embodiments, the text portion type may be determined based on the application of a classification model. For instance, a machine learning model may be configured to classify text portions or documents into one or more of a set of types of text. Then, a machine learning model may be selected that is specific to the text portion type.

In some embodiments, different types of text may be associated with different types of models. Alternatively, or additionally, a type of text may be associated with a machine learning model that is specifically trained for that type of text.

A relevance score is determined at 1510 by comparing the text portion to the query using a machine learning model. According to various embodiments, any of a variety of machine learning models may be used.

In some embodiments, a machine learning model may be implemented as a pre-trained text embedding model trained as discussed with respect to FIG. 14. For instance, a machine learning model may be implemented as a bi-encoder in which text portions are separately encoded and then mapped to a common embedding space. Then, at 1506, the relevance score may depend on the distance between the query and the text portion in the embedding space.

As another example, a machine learning model may be implemented as a cross-encoder model. In a cross-encoder, all or a portion of the query and all or a subportion of the text portion may be compared in a pair model, which may be built on a transformer-based language model such as BERT (Bidirectional Encoder Representations from Transformers) or RoBERTa (Robustly Optimized BERT Pretraining Approach).

Figure 16:
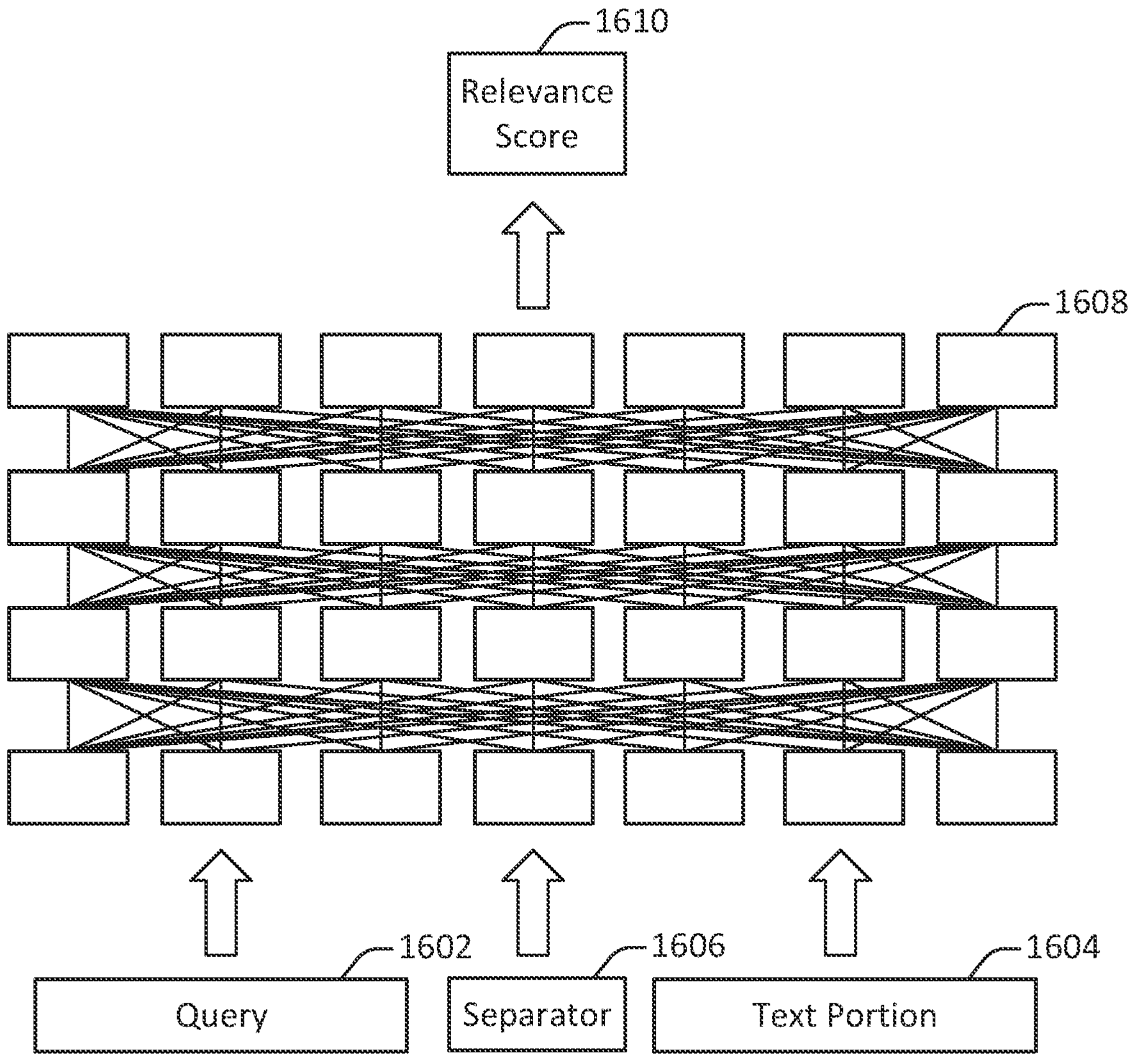
FIG. 16 illustrates a cross-encoder modeling system, configured in accordance with one or more embodiments.

FIG. 16 illustrates a cross-encoder modeling system, configured in accordance with one or more embodiments. The cross-encoder modeling system accepts as input both a query portion 1602 and a text portion 1604. The query and text portions are separated in the input by a separator 1606. The cross-encoder modeling system that employs a number of layers of cross-linked neurons 1608 to produce a relevance score 1610.

According to various embodiments, the number of layers of neurons and the number of neurons in each layer may be strategically determined for accuracy and efficiency. For instance, one or more text embedding models may be created using a training data set. The text embedding models may then be used to produce relevance scores for a number of different queries and text portions. The relevance scores may then be used to create a loss function for hyperparameter tuning of the number of layers of neurons and number of neurons per layer in a cross-encoder model. Then, the cross-encoder model may be used for future iterations without pre-training.

In some embodiments, a combination of approaches may be used. For instance, in a trans-encoder, one or more bi-encoder representations may be used to fine-tune a cross-encoder. Then, the cross-encoder may be used to perform more accurate knowledge extraction using inter-sentence modeling. The resulting information may be used to improve the accuracy of the bi-encoder model. The process may be repeated to iteratively bootstrap from both the bi-encoder and the cross-encoder.

A determination is made at 1508 as to whether the relevance score exceeds a designated threshold. According to various embodiments, the designated threshold may be strategically determined based on various factors. For example, different machine learning models may produce relevance scores having different distributions, leading to a designated threshold that is model-dependent. As another example, the designated threshold may be determined based at least in part on the number of text portions included in the request and a desired reduction of the text portions. For instance, the designated threshold may be determined so as to select a particular number or proportion of the text portions as relevant. As another example, the designated threshold may be determined so as to select more or fewer text portions as relevant, which may involve various tradeoffs. For instance, setting a lower designated threshold may result in selecting more documents as relevant, potentially leading to improved accuracy in answering the query at the expense of relatively greater cost and compute time.

If it is determined that the relevance score does not exceed the designated threshold, then at 1514 the selected text portion is excluded for query analysis. If instead it is determined that the relevance score does exceed the designated threshold, then at 1516 the selected text portion is included for query analysis.

A determination is made at 1518 as to whether to select an additional text portion for analysis. According to various embodiments, text portions may continue to be selected until all available text portions have been analyzed for relevance.

If it is determined not to select an additional text portion for analysis, then at 1520 an answer to the query is determined based on the included text portions. According to various embodiments, determining an answer to the query may involve communicating with a text generation modeling system using the selected text portion.

In some implementations, determining an answer to the query may involve implementing one or more elements from workflows discussed herein. Optionally, the text portions may be reduced further, for instance as described with respect to the method 1700 shown in FIG. 17.

Figure 17:
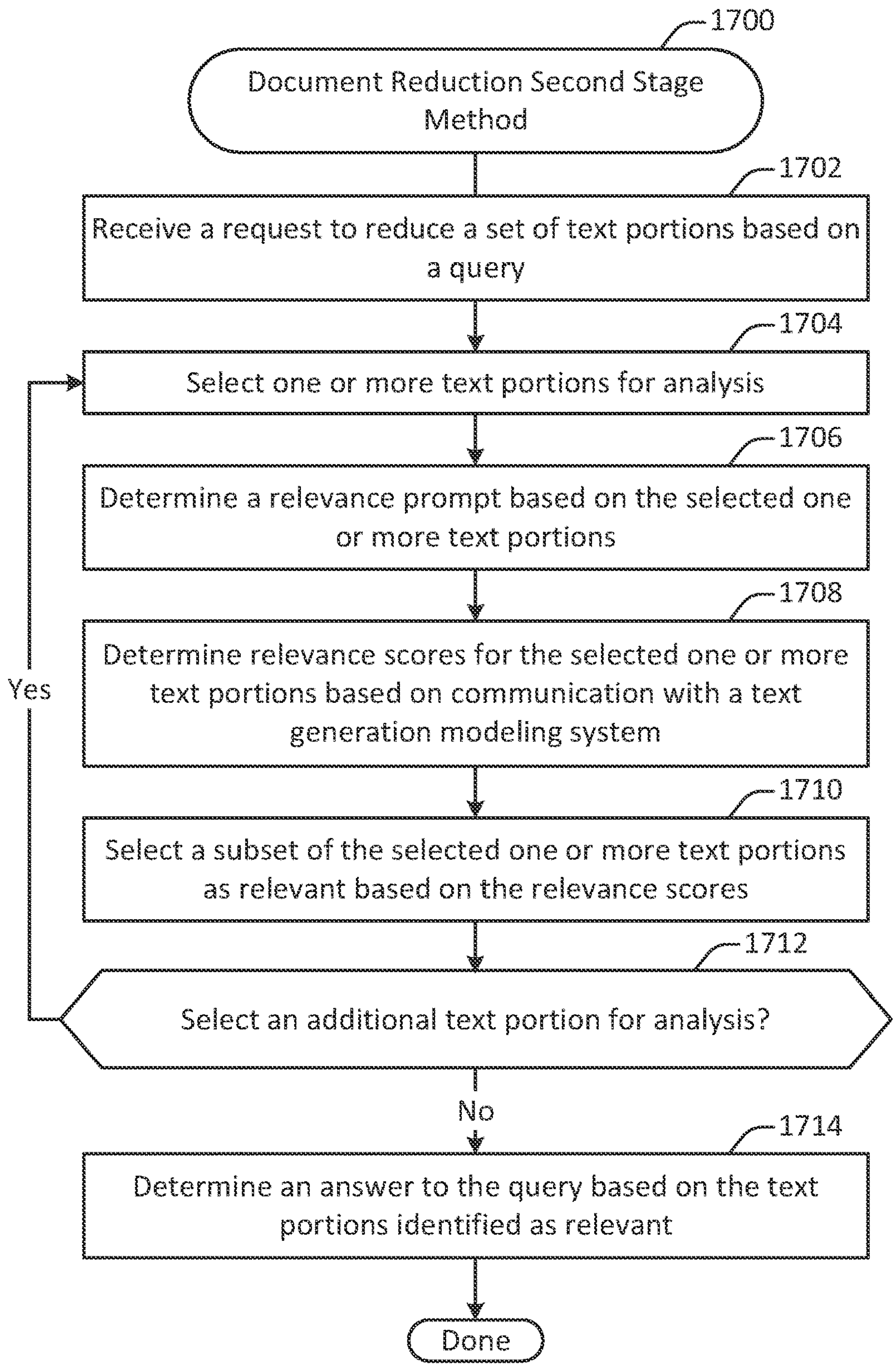
FIG. 17 illustrates a document reduction second stage method, performed in accordance with one or more embodiments.

FIG. 17 illustrates a document reduction second stage method 1700, performed in accordance with one or more embodiments. The method 1700 may be performed at a text generation system such as the system 200 shown in FIG. 2. For instance, the method 1700 may be performed at the text generation interface system 210.

In particular embodiments, the methods 900 and 1000 illustrated in FIG. 9 and FIG. 10 may be used as a second stage deduction process. In such a configuration, the methods 900 and 1000 may correspond to the operations 1704 through 1712.

A request is received at 1702 to reduce a set of text portions based on a query. In some embodiments, the request may be generated as discussed with respect to operation 108. The request may identify a query to answer and a set of text portions that may be used to answer the query. Optionally, the request may be generated after performing one or more of the preprocessing operations discussed with respect to the method 1400 shown in FIG. 14 and/or one or more of the document reduction operations discussed with respect to the method 1500 shown in FIG. 15.

One or more text portions are selected for analysis at 1704. In some embodiments, text portions may be selected so as to fit within a designated chunk size. Additional details regarding the division of text into chunks are discussed with respect to the method 600 shown in FIG. 6.

A relevance prompt is determined at 1706 based on the selected one or more text portions. In some embodiments, the relevance prompt template may also include an instruction to the text generation modeling system to evaluate and/or rank the included text portions for relevance against the query. The prompt template may also include one or more additional instructions, such as an instruction to format the text generated by the text generation model as structured text. For instance, the structured text may be implemented as a JSON list. An example of a relevance prompt template is as follows:

Evaluate whether these documents are relevant to this research request or query:

"{{text}}"

$$DOCUMENTS$$

{{documents}}

$$/DOCUMENTS$$

Only respond with relevant documents. In order to be deemed relevant, a document must directly answer the request or query. A document should also be considered relevant if it reaches a conclusion in opposition to the research request.

If there are no relevant documents, do not include any in your response.

Assign a relevance score to each document, judging its relevance to the research request or query: "{{text}}". The score should correlate to these values:

5—the document is directly on-point (i.e., it precisely responds to every aspect of the query or request, even if it is in opposition to the request, and not a similar but different issue; it fully and conclusively settles the question raised in the request either in favor or against the intention of the request, if any)

4—the document may provide a useful analogy to help answer the request, but is not directly responsive 3—the document is roughly in the same topical area as the request, but otherwise not responsive 2—the document might have something to do with the request, but there is no indication that it does in the text provided 1—the document is in no way responsive to the request Return a JSON array of objects, each object representing a relevant case, ordered with the most relevant case first. Each object in the array will have the keys:

\'result_id\'—string, the result ID

\'reason_relevant\'—string, a description of how the document addresses the research request or query: "{user_request}". In drafting this response, only draw from the excerpted language of the document; do not include extraneous information.

\'relevance_score\'—number, between 1-5, of how relevant the document is to the research request or query: "{user_request}"

\'quotes\'—array of strings. For each document, quote the language from the document that addresses the request. In finding these quotes, only draw from the excerpted language; do not include extraneous information. Do not put additional quotation marks around each quote beyond the quotation marks required to make valid JSON.

Only valid JSON. Quotation marks within strings must be escaped with a backslash (\'\\\'). Examples for reason_relevant: \'"The concept of \\"equitable tolling\\" applies in this case."\', \'"The case overturns a lower court decision that found a state abortion restriction unconstitutional based on Roe v. Wade and Casey, and argues that the viability rule from those cases is not the \\ "central holding.\\" This case calls into question the continued validity of Roe v. Wade."\'

If there are no relevant documents, respond with an empty array.

<|endofprompt|>

Here's the JSON:

Relevance scores for the selected one or more text portions are determined at 1708 based on communication with a text generation modeling system. In some embodiments, the relevance scores may be identified by sending the relevance prompt to the remote text generation modeling system via an API request. A text generation model implemented at the remote text generation modeling system may then complete the relevance prompt, after which it may be sent back to the text generation interface system. The text generation interface system may then extract the relevance from the completed query division prompt, for instance by parsing JSON included in the completed request.

In particular embodiments, the relevance prompts may be implemented as high-read, low-write. In such a configuration, the text generation modeling system may be instructed to provide a small amount of feedback for a text portion rather than to generate a description in natural language. For instance, the text generation modeling system may be asked to provide a sequence of numbers corresponding to relevance scores for the sequence of text portions. In this way, the cost associated with interacting with the text generation modeling system may be reduced.

A subset of the selected one or more text portions are selected as relevant at 1710 based on the relevance scores. According to various embodiments, the subset of the text portions may be selected as relevant based on a comparison of the relevance score against a designated threshold. As discussed with respect to the operation 1508 shown in FIG. 15, a relevance threshold may be determined based on various factors.

A determination is made at 1712 as to whether to select an additional text portion for analysis. According to various embodiments, additional text portions may continue to be selected until all available text portions have been analyzed for relevance.

If it is determined not to select an additional text portion for analysis, then at 1714 an answer to the query is determined based on the text portions selected as relevant. According to various embodiments, determining an answer to the query may involve communicating with a text generation modeling system using the selected text portion. Determining an answer to the query may involve implementing one or more elements from workflows discussed herein.

According to various embodiments, an answer to a query may be determined in various ways after performing one or two stages for reducing the number of input documents. In some embodiments, a particular workflow may be performed, depending on the type of query. Various types of suitable workflows are discussed throughout the application as filed. In some implementations, such as in the context of document review and/or retrieval, a chaining approach may be employed. In a chaining approach, the documents remaining after document reduction may be divided into chunks, for instance as discussed with respect to FIG. 6. Then, individual chunks may be provided to the text generation system with the same prompt, for instance a request to answer a query based on the text included in the chunk. The completed prompt templates may then be included in a single prompt along with a request for the large language model implemented at the text generation modeling system to summarizing a single answer based on the chunk-level answers.

In some embodiments, an answer to the query may be determined at least in part by employing a prompt that includes an instruction to determine an answer to a query based on one or more prompts identified as being potentially relevant. An example of such a prompt in the legal context is provided below:

Answering a Question about a {{context}}

The following is a Question being asked by a User and an excerpt from a Contract that we believe contains the answer to the question.

Question: {{query}}

Contract Clauses:

<contract_clauses>

{% for contract_section in paragraphs %}

<section>

<text>{{contract_section.text}}</text>

</section>

{% endfor %}

</contract_clauses>

Please answer the Question using only information in the Clauses provided. If the Clauses do not contain the answer to the Question, never try to guess—just state that the question cannot be answered from the information provided.

Provide your answer in the following XML format:

<question_comprehension>[restate what the Question is trying to ask in clear terms to show that you understood the question]</question_comprehension>

<quote_text>[quote the text from the Clauses above that answer the question. Provide exact quote with nothing added, though you may use ellipses ( . . . ) to skip less relevant portions in a quote. If the Question is asking about the presence or absence of a certain term, within a type of clause, the clause should be listed here even if the term is absent. If the Question cannot be answered from the information in the Clauses, write NO ANSWER here. If all of the text from the Clauses is relevant to the question, just write ALL RELEVANT here.]</quote_text>

<full_answer>[your full answer to the question here, including any explanation you think appropriate to give (or write NO ANSWER if you said NO ANSWER above). Where numerical amounts are involved or where the question or clause language are complex, write out the step-by-step reasoning required to come to the answer.]</full_answer>

<short_answer>[{{answer_type_instruction}} (or write NO ANSWER if you said NO ANSWER above)]</short_answer>

<|endofprompt|>

<question_comprehension>

In some embodiments, a query may be answered via multiple prompts corresponding to, for instance, different portions of a contract and/or excerpts from different contracts. In such a situation, one or more consolidation prompts may be used to consolidate the answers from these different prompts into a single answer. An example of a consolidation prompt is as follows:

#Instructions

Your job is to consolidate a number of different answers about parts of a document to come up with the best answer to a question that responds for the document overall.

The partial answers presented to you will include a summary answer, an explanation of the answer, and the language the partial answer relied upon to come to that conclusion.

Make sure your overall answer is only based on the information provided, and no extraneous information.

Contracts often contain rules and exceptions or carveouts for certain situations. If you see this, note both the rule and the exception.

In some cases, one of the partial answers will be correct and the others incorrect. In those situations, you can simply copy the correct answer.

In other cases, multiple partial answers will be correct and provide parts of the overall answer. In those situations, you should synthesize your answer by combining information from the partial answers.

If the partial answers do not provide enough information to fully answer the question, give as good of an answer as you can but fold in the uncertainty of your answer.

#Output format

Your output should be in this format:

<overall_answer>[string; an overall answer for the document. Always keep it on one line, even if it is a list—do not make bullet points.]</overall_answer>

<short_answer>[summarize your answer in 1-5 words]</short_answer>

<partials_relied_upon>[space separated list of integers representing the IDs of the partial answers that were used to create the overall answer. If a partial answer is wrong or didn't contribute any information to the overall answer, do not list it here</partials_relied_upon>

<explanation>[explain why you chose the overall answer you chose]</explanation>

#Examples

Example 1:

Question: What is the vesting schedule of the stock option?

Partial Answers:

<partial_answers>

<partial_answer>

<id>1</ id>

<language>The remainder of the shares shall vest in increments of 1/48th of the Total Shares each month for the following 3 years</language>

<summary>1/48th monthly over 3 years</summary>

<explanation>The contract says that 1/48th of the shares will vest every month and that this will continue for 3 years, so the vesting schedule is 1/48th of the shares on a monthly basis for 3 years.</explanation>

</partial_answer>

<partial_answer>

<id>2</ id>

<language>¼th of the shares will vest 1 year after the date of this agreement.</language>

<summary>¼th after 1 year</summary>

<explanation>The contract says that one quarter of the shares will vest on the 1-year anniversary of the date of this agreement, thus the vesting schedule is ¼th after 1 year.</explanation>

</partial_answer>

In the above example, your response would be:

<overall_answer>The vesting schedule is ¼ quarter of the shares vest at 1 year from the date of this agreement, and 1/48th of the shares shall vest monthly thereafter for the following 3 years.</overall_answer>

<partials_relied_upon>1 2</ partials_relied_upon>

#Task

OK, let's begin

Question: {{question}}

```
Partial Answers:
<partial_answers>
{% for partial_answer in partial_answers %}
<partial_answer>
<id>{{loop.index0}}</ id>
<language>{{partial_answer.paragraph.text}}</language>
<summary>{{partial_answer.short_form_answer}}</summary>
<explanation>{{partial_answer.answer_to_question}}</explanation>
</partial_answer>
{% endfor %}
</partial_answers>
<|endofprompt|>
<overall_answer>
```

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of large language models. However, the techniques of disclosed herein apply to a wide variety of language models. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:

receiving via a communication interface a request to generate a response to a natural language query based on a plurality of input documents;

determine a text generation flow based upon the request;

determine a prompt template based on the determined text generation flow;

determine a portion of text from each of the plurality of input documents;

determine a plurality of relevance prompts, wherein each of the relevance prompts is associated with one of the plurality of input documents and based upon the prompt template, and each of the plurality of relevance prompts includes the respective portion of text from the associated one of the plurality of input documents and a natural language instruction to generate novel text characterizing relevance of the respective portion of text to the natural language query;

transmitting the plurality of relevance prompts to a large language model for completion;

receiving from the large language model a plurality of relevance prompt response messages corresponding with the plurality of relevance prompts, each of the plurality of relevance prompt response messages including a respective portion of novel text characterizing relevance of the respective portion of text to the natural language query;

determining via a processor a designated document relevance score for each of the plurality of input documents based on the respective portions of novel text, wherein determining the designated document relevance score involves aggregating a subset of a plurality of chunk relevance scores corresponding to a plurality of document chunks of the associated input document:

selecting via a processor a subset of the input documents based on the plurality of document relevance scores;

determining the response to the natural language query based on query response text generated by the large language model in a plurality of query response messages generated in response to a plurality of query response prompts providing the natural language query and the subset of the input documents to the large language model, the query response text including a plurality of intermediate answers included in the plurality of query response messages and corresponding to the document chunks; and transmitting the response to a remote computing device via the communication interface.

2. The method recited in claim 1, wherein the designated document score quantifies relevance of the designated document to the natural language query.

3. The method recited in claim 2, wherein the set of natural language instructions include an instruction to generate a respective chunk relevance score of the plurality of chunk relevance scores, the respective chunk relevance score corresponding to the respective portion of text, and wherein the respective portion of novel text includes the respective chunk relevance score.

4. The method recited in claim 3, wherein determining the designated document score comprises determining a weighted average of the subset of the plurality of chunk relevance scores.

5. The method recited in claim 3, wherein determining the designated document score comprises determining a sum of the subset of the plurality of chunk relevance scores.

6. The method recited in claim 3, wherein determining the designated document score comprises determining a maximum of the subset of the plurality of chunk relevance scores.

7. The method recited in claim 3, wherein determining the designated document score comprises evaluating the subset of the plurality of chunk relevance scores, the subset of the plurality of chunk relevance scores including a designated chunk relevance score above a designated threshold.

8. The method recited in claim 3, wherein each of the chunk relevance scores corresponds to a single token as processed by the large language model.

9. The method recited in claim 8, wherein the novel text consists of one or more of the chunk relevance scores.

10. A text generation interface system including one or more processors, a large language model interface, and a communication interface, the text generation interface system being configured to perform a method comprising:

receiving via a communication interface a request to generate a response to a natural language query based on a plurality of input documents;

determining a text generation flow based upon the request;

determining a prompt template based on the determined text generation flow;

determining a portion of text from each of the plurality of input documents;

determining a plurality of relevance prompts, wherein each of the relevance prompts is associated with one of the plurality of input documents and based upon the prompt template, and each of the plurality of relevance prompts includes the respective portion of text from the associated one of the plurality of input documents and a natural language instruction to generate novel text characterizing relevance of the respective portion of text to the natural language query;

transmitting the plurality of relevance prompts to a large language model for completion;

receiving from the large language model a plurality of relevance prompt response messages corresponding with the plurality of relevance prompts, each of the plurality of relevance prompt response messages including a respective portion of novel text characterizing relevance of the respective portion of text to the natural language query;

determining via a processor a designated document relevance score for each of the plurality of input documents based on the respective portions of novel text, wherein determining the designated document relevance score involves aggregating a subset of a plurality of chunk relevance scores corresponding to a plurality of document chunks of the associated input document;

selecting via a processor a subset of the input documents based on the plurality of document relevance scores;

determining the response to the natural language query based on query response text generated by the large language model in a plurality of query response messages generated in response to a plurality of query response prompts providing the natural language query and the subset of the input documents to the large language model, the query response text including a plurality of intermediate answers included in the plurality of query response messages and corresponding to the document chunks; and transmitting the response to a remote computing device via the communication interface.

11. The method recited in claim 10, the designated document score quantifies relevance of the designated document to the natural language query, and wherein the set of natural language instructions include an instruction to generate a respective chunk relevance score of the plurality of chunk relevance scores, the respective chunk relevance score corresponding to the respective portion of text, and wherein the respective portion of novel text includes the respective chunk relevance score.

12. One or more non-transitory computer readable media having instructions thereon for performing a method, the method comprising:

receiving via a communication interface a request to generate a response to a natural language query based on a plurality of input documents;

determining a text generation flow based upon the request;

determining a prompt template based on the determined text generation flow;

determining a portion of text from each of the plurality of input documents;

determining a plurality of relevance prompts, wherein each of the relevance prompts is associated with one of the plurality of input documents and based upon the prompt template, and each of the plurality of relevance prompts includes the respective portion of text from the associated one of the plurality of input documents and a natural language instruction to generate novel text characterizing relevance of the respective portion of text to the natural language query;

transmitting the plurality of relevance prompts to a large language model for completion;

receiving from the large language model a plurality of relevance prompt response messages corresponding with the plurality of relevance prompts, each of the plurality of relevance prompt response messages including a respective portion of novel text characterizing relevance of the respective portion of text to the natural language query;

determining via a processor a designated document relevance score for each of the plurality of input documents based on the respective portions of novel text, wherein determining the designated document relevance score involves aggregating a subset of a plurality of chunk relevance scores corresponding to a plurality of document chunks of the associated input document;

selecting via a processor a subset of the input documents based on the plurality of document relevance scores;

determining the response to the natural language query based on query response text generated by the large language model in a plurality of query response messages generated in response to a plurality of query response prompts providing the natural language query and the subset of the input documents to the large language model, the query response text including a plurality of intermediate answers included in the plurality of query response messages and corresponding to the document chunks; and transmitting the response to a remote computing device via the communication interface.

13. The one or more non-transitory computer readable media recited in claim 12, wherein the designated document score quantifies relevance of the designated document to the natural language query.

14. The one or more non-transitory computer readable media recited in claim 13, wherein the set of natural language instructions include an instruction to generate a respective chunk relevance score of the plurality of chunk relevance scores, the respective chunk relevance score corresponding to the respective portion of text, and wherein the respective portion of novel text includes the respective chunk relevance score.

* * * * *